United States Patent
Kondo et al.

(10) Patent No.: US 7,117,397 B1
(45) Date of Patent: Oct. 3, 2006

(54) APPARATUS AND METHOD FOR PREVENTING AN ERRONEOUS OPERATION AT THE TIME OF DETECTION OF A SYSTEM FAILURE

(75) Inventors: Hiroshi Kondo, Kawasaki (JP); Keizo Azuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 09/723,768

(22) Filed: Nov. 28, 2000

(30) Foreign Application Priority Data

Dec. 15, 1999 (JP) .................................. 11-355783
Dec. 15, 1999 (JP) .................................. 11-355784

(51) Int. Cl.
*G06F 11/00* (2006.01)

(52) U.S. Cl. .............................. 714/48; 714/4; 714/25; 714/34

(58) Field of Classification Search .................... 714/4, 714/25, 34, 48
See application file for complete search history.

(56) References Cited

U.S. PATENT DOCUMENTS

| 5,280,606 A | 1/1994 | Jippo et al. ................. 395/575 |
| 5,500,940 A * | 3/1996 | Skeie .......................... 714/25 |
| 5,530,946 A * | 6/1996 | Bouvier et al. ............... 714/23 |
| 5,600,791 A * | 2/1997 | Carlson et al. ............... 714/47 |
| 5,740,357 A * | 4/1998 | Gardiner et al. .............. 714/57 |
| 5,951,683 A * | 9/1999 | Yuuki et al. .................... 713/1 |
| 6,052,722 A * | 4/2000 | Taghadoss .................. 709/223 |
| 6,401,119 B1 * | 6/2002 | Fuss et al. .................. 709/224 |

FOREIGN PATENT DOCUMENTS

| JP | 63-88660 | 4/1988 |
| JP | H01-316851 | 12/1989 |
| JP | 3-259349 | 11/1991 |
| JP | H11-3293 | 1/1999 |
| JP | 11-272489 | 10/1999 |

* cited by examiner

*Primary Examiner*—Robert Beausoliel
*Assistant Examiner*—Emerson Puente
(74) *Attorney, Agent, or Firm*—Greer, Burns & Crain, Ltd.

(57) ABSTRACT

If a failure is detected in a system, it is automatically judged which operation mode should be selected, a system-down mode or a dynamic degeneracy mode. If a failed device is severed from the system, the severance of the device is reported by making a device control unit access the device or changing the state of the device.

16 Claims, 23 Drawing Sheets offline-enable

0    SYSTEM-DOWN MODE

1    SEVERABLE

F I G. 5 reg-access-check-enable

00     SYSTEM-DOWN MODE

10     SEVERABLE

11     SEVERABLE/PSEUDO-INTERRUPT AVAILABLE

F I G. 7

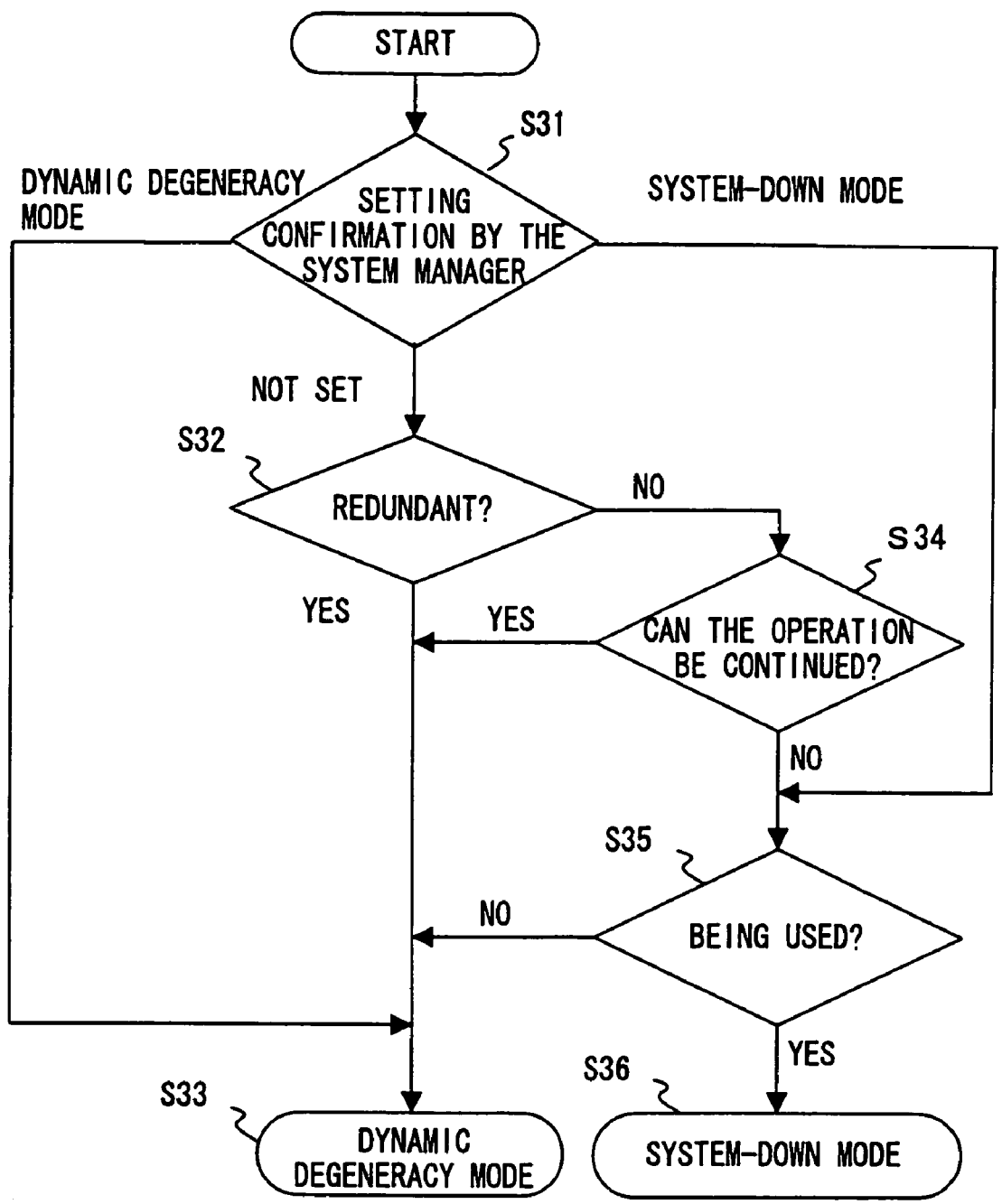
F I G. 8

| IMPORTANCE | |
|---|---|
| 0 | LOW |
| 1 | HIGH |

FIG. 9

| FLAG | |
|---|---|
| 0 | NOT USED |
| 1 | BEING USED |

FIG. 10

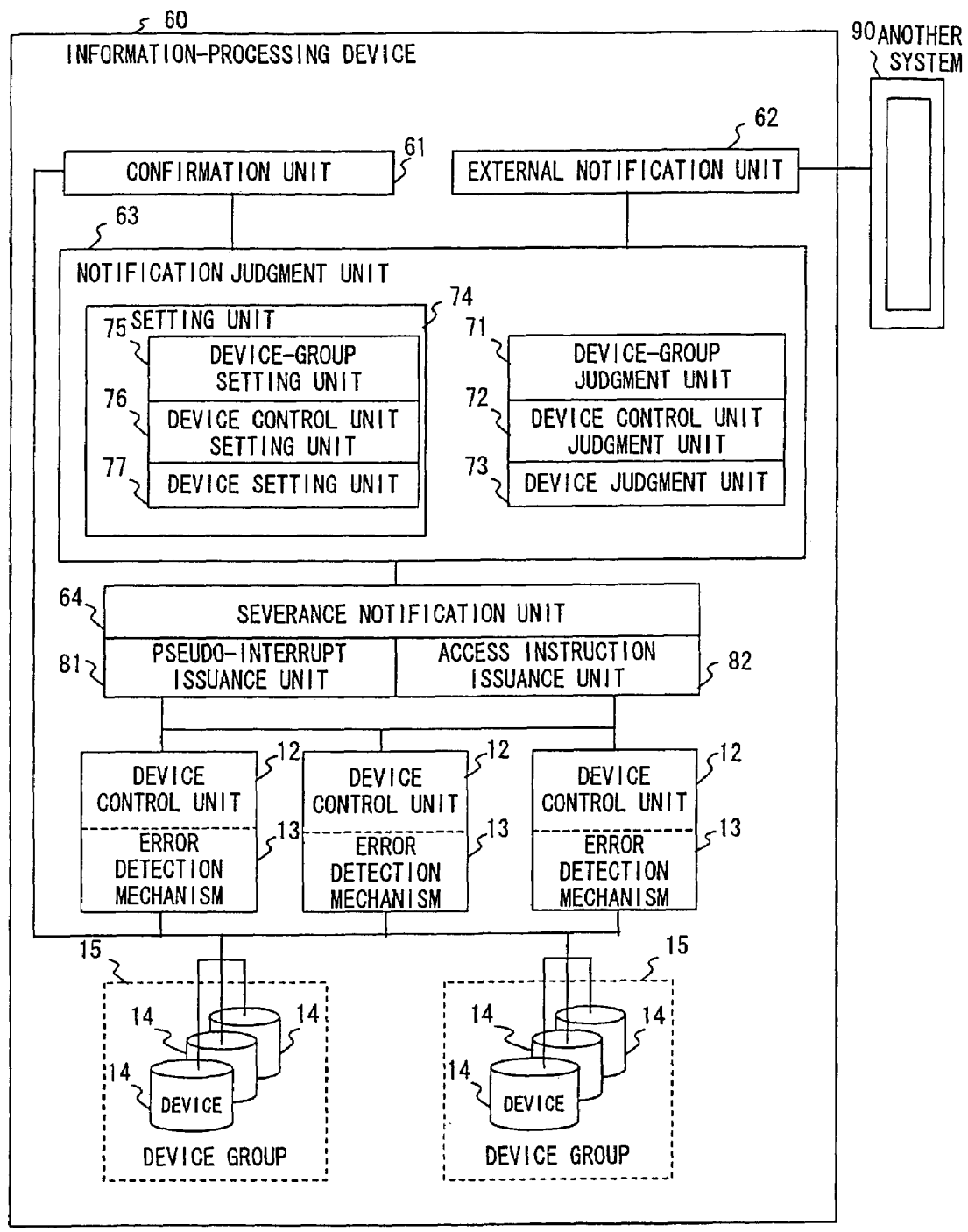
F I G. 1 5 offline-enable

0   UNSEVERABLE

1   SEVERABLE

FIG. 18 reg-access-check-enable

00 UNSEVERABLE

10 SEVERABLE

11 SEVERABLE/PSEUDO-INTERRUPT AVAILABLE

FIG. 20

STATE OF USE

0    NOT USED

1    BEING USED

FIG. 22

APPARATUS AND METHOD FOR PREVENTING AN ERRONEOUS OPERATION AT THE TIME OF DETECTION OF A SYSTEM FAILURE

BACKGROUND OF THE INVENTION

Field of the Invention

The present invention relates to an apparatus for judging which operation mode should be selected, a mode to stop a system or a mode to sever a failed device from the system and to continue the operation when there is a failure during the operation of the system and a method thereof.

The present invention relates to a notification apparatus for notifying a notification destination, such as a device control unit, another system, etc., that performs control over each device, of the severance of a failed device when there is a failure during the operation of the system in a system with a dynamic degeneracy function to sever the failed device from the system and to continue the operation and a method thereof.

Along with the advancement of network computing, the reduction of the stoppage rate (system-down rate) of a computer due to a hardware failure is desired to implement a highly reliable system applicable to key business.

As a technology to implement such a highly reliable system, a fault tolerant computer for duplicating devices, which are the hardware resources of the computer, and dynamically severing a failed device from the system using the fault tolerant function of hardware can be considered. To sever a device means to prohibit the use of the device. As another technology, a cluster system, etc., for implementing a reciprocal back-up function by the co-operated process of a plurality of computers can also be considered.

If the failure of a variety of hardware devices is detected during the operation of a system, generally the system is immediately stopped in order to prevent an erroneous operation. However, some computer systems sever the failed device from the system and continue the operation to reduce the system-down rate due to the failure of the hardware devices. Such a function is called a dynamic degeneracy function. To sever a device means to prohibit the use of the device by either hardware or software.

However, in the case of a computer system that severs a device from the system and continues the operation, each device, which is a hardware device of the computer, must be duplicated. This is because if the failed device is the only device of such a kind used in the computer and is a key device in the operation of the system, the system cannot operate without the device.

If a device is dynamically severed, a driver that performs control over a system must support the operation of the system when the device is severed. For example, a special interface must be prepared in advance to notify the driver of the severance of the device, and the driver must support a function to recognize the severance of the device using the special interface.

In the case of a computer system that notifies a driver of the severance of a device by prohibiting access to a failed device, it must be checked whether there is a failure in accessing to the device considering that the driver may fail to access to the device.

In this case, if the interface described above is not prepared in advance, the driver recognizes the severance of the device the first time the driver has accessed the device after a failure occurred.

Furthermore, if an application program that is operating in another computer system related to a severed device is notified of the severance of the device, a special interface must be prepared in advance and the application program must support a function to recognize the severance of the device using the interface.

However, the conventional systems described above have the following problems.

Generally, if the unrestorable hardware failure is detected during the operation of a system, a system selecting a dynamic degeneracy that severs a failed device and continues the operation of the system is more reliable than a system selecting a system-down that immediately stops a computer.

However, in the case of the computer system that supports a dynamic degeneracy, sometimes a device without which the operation of a system cannot be continued is severed due to a wrong setting by a system manager, etc. In this case, there is a possibility that secondary damage, such as an erroneous operation due to the severance of the device, the hang-up of the system, etc., may occur and that the damage may be more serious than the emergency stop of the computer.

A variety of devices used in a computer system and a driver for performing control over the devices are independently manufactured and sold by a variety of makers. In a computer system called an open system, generally a user organizes an actual system by combining a variety of these devices and a driver.

A driver provided in the market of such an open system is generally provided with only both an access interface to a device and a function to perform control of an interrupt from the device, and is not provided with a special interface for a dynamic degeneracy. Therefore, if a user wants to organize a highly reliable open system with a dynamic degeneracy function, usable devices and a driver are limited to a specific maker, which is a problem.

In a system that notifies a driver of the severance of a device by prohibiting access to a failed device, the severance of the device cannot be recognized for a long time if the driver does not access the device for a long time after a failure has occurred, which is another problem.

In particular, in an apparatus where a driver does not operate unless an interrupt occurs to the apparatus from outside, there is a possibility that an interrupt to an already severed device may have to wait for a long time and an erroneous operation, such as no detection of an object to be detected, etc., may occur.

If an application program in another system does not support a function to recognize the severance of a device using a special interface, the application program cannot be notified of the severance of the device. Therefore, after the device is severed, the device is also recognized to operate normally, which is another problem. In particular, if the application program is executing a charging process accompanying the use of the apparatus, an unreasonable charge is imposed, which is a bigger problem.

SUMMARY OF THE INVENTION

It is an object of the present invention to provide an apparatus for preventing damage due to severing a failed device from a system when there is a failure during the operation of the system and a method thereof. It is another object of the present invention to provide a notification apparatus for notifying a notification destination, of the severance of a failed device and preventing an erroneous operation due to the failure to recognize the severance without using a special interface and a method thereof.

The operation determination apparatus of the present invention comprises a determination device and an operation device, and determines an operation mode when there is a failure in a system. The determination device judges which operation mode should be selected: a system-down mode to stop a system or a dynamic degeneracy mode to prohibit the use of a failed part and to continue the operation of the system. The operation device performs an operation corresponding to the selected operation mode.

The notification apparatus of the present invention comprises a notification device. In the first aspect, when there is a failure in a system and the use of a failed device is prohibited, the notification apparatus notifies a device control unit that performs control over the device, of the prohibition on the use of the device by enabling the device control unit to access the device.

In the second aspect, when there is a failure in a system and the use of a failed device is prohibited, the notification device changes the state of the device to a state where another system related to the device can recognize that the use of the device is prohibited.

BRIEF DESCRIPTIONS OF THE DRAWINGS

FIG. 5 shows the information of the first device group.

FIG. 7 shows the information of the first device control unit.

FIG. 8 is a flowchart showing the first judgment process in units of devices.

FIG. 9 shows an importance flag.

FIG. 10 shows a state flag.

FIG. 15 shows the configuration of the second information-processing device.

FIG. 18 shows the information of the second device group.

FIG. 20 shows the information of the second device control unit.

FIG. 22 shows a state-of-use flag.

DESCRIPTION OF THE PREFERRED EMBODIMENTS

The preferred embodiments of the present invention are described in detail below with reference to the drawings.

Figure 1:
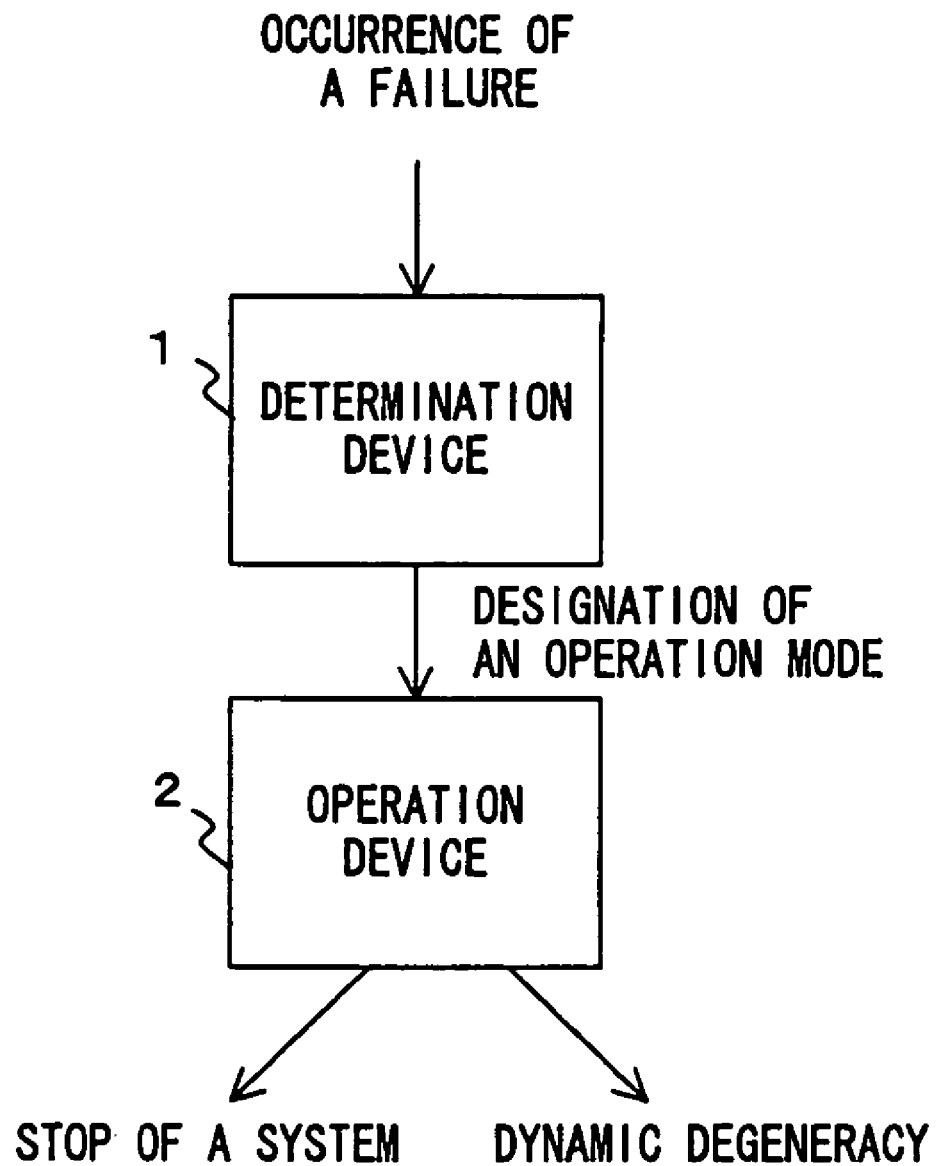
FIG. 1 shows the basic configuration of the operation determination apparatus of the present invention.

FIG. 1 shows the basic configuration of the operation determination apparatus of the present invention. The operation determination apparatus shown in FIG. 1 comprises a determination device 1 and an operation device 2, and determines an operation mode when there is a failure in a system.

The determination device 1 judges which operation mode should be selected, a system-down mode to stop a system or a dynamic degeneracy mode to prohibit the use of a failed part and to continue the operation of the system. The operation device 2 performs an operation corresponding to the selected operation mode.

The determination device 1 selects either a system-down mode or a dynamic degeneracy mode as the operation mode of the system. If the selected operation mode is a system-down mode, the operation device 2 stops the system. If the selected operation mode is a dynamic degeneracy, the operation device 2 prohibits access to a failed device, etc., and continues the operation of the system.

As described above, the subject matter of the present invention is to automatically judge which operation mode should be selected, a system-down mode or a dynamic degeneracy mode.

According to such an operation determination apparatus, when there is a failure in a system, whether a dynamic degeneracy mode is applicable is automatically judged. Therefore, a possibility that a dynamic degeneracy mode is selected by mistake can be reduced. Accordingly, damage due to the accidental severance of a device from the system can be prevented.

A dynamic degeneracy mode can be selected as often as possible by making such a judgment on an operation mode. Therefore, a more reliable system can be implemented.

For example, the determination device 1 shown in FIG. 1 corresponds to an operation mode determination unit 11 shown in FIG. 2, which is described later, and the operation device 2 corresponds to an information-processing device 10 shown in FIG. 2.

When detecting a failure in a device during the operation of a system by an error detection mechanism, the information-processing device in the first preferred embodiment of the present invention judges which operation mode should be selected, a system-down mode to immediately stop the system to prevent an erroneous operation or a dynamic degeneracy mode to sever a failed device (component) from the system and continue the operation. The first preferred embodiment includes both a driver interface for implementing a highly reliable system and a control method thereof.

In the case of a dynamic degeneracy mode, a device control unit, such as a driver for performing control over a device to be severed, etc., must support the operation when the device is severed, and it is configured in such a way that the device can be severed only when the operation of the system can be maintained if the device is severed.

If there is an unrestorable failure in a specific device and the device affects another device, in a dynamic degeneracy mode, the affected device should also be simultaneously severed. For example, if a plurality of I/O (input/output) devices are connected to a specific I/O bus and the I/O bus fails, all I/O devices connected to the failed I/O bus must be simultaneously severed.

In this case, if there is even one device without which the operation of the system cannot be maintained, or which does not support the operation when a driver for performing control over the device is severed among the devices to be severed, there is a possibility that severing the device by mistake may cause secondary damage.

In this case, which operation mode should be selected, a system-down mode or a dynamic degeneracy mode, can be automatically judged and the damage due to the severance of the device can be prevented by giving priority among and judging such a variety of conditions.

Figure 2:
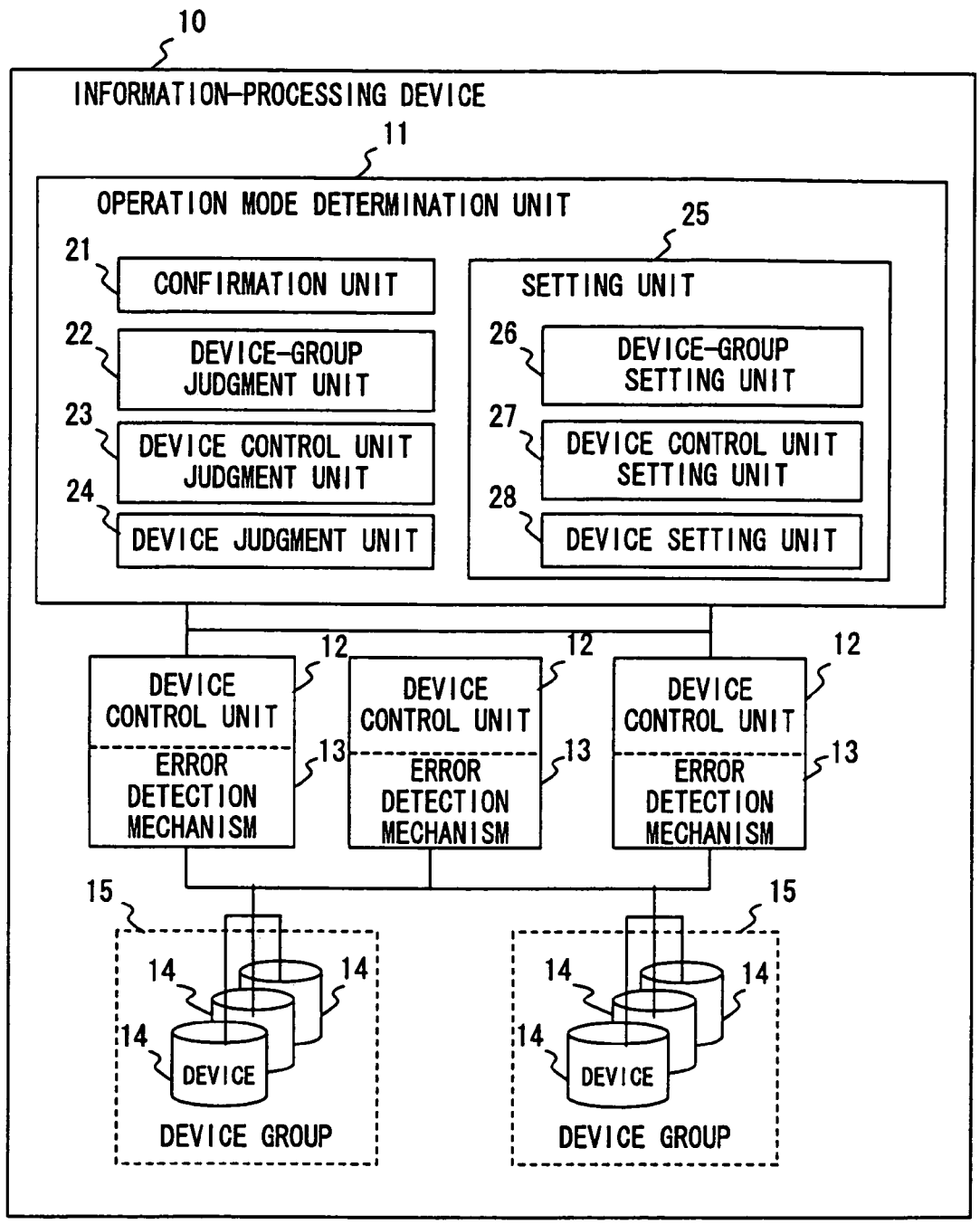
FIG. 2 shows the configuration of the first information-processing device.

FIG. 2 shows the configuration of the information-processing device in the first preferred embodiment of the present invention. The information-processing device 10 shown in FIG. 2 (the relevant system) comprises an operation mode determination unit 11, a plurality of device control units 12, a plurality of error detection mechanisms 13 accompanying the plurality of device control units 12 and devices 14 controlled by the device control units 12.

The device control unit 12 is, for example, driver software for performing control over one or more devices 14. The error detection mechanism 13 detects the failure of a device 14 and notifies the operation mode determination unit of the failure.

When there is a failure in a specific device, the device group 15 indicates an aggregate of other devices affected by the device and the failed device. In other words, when a specific device is severed, the device group 15 corresponds to an aggregate of other devices to be severed together with the device and the specific device. Generally, the device control unit 12 for performing control over devices 14 that belong to a specific device group 15 can also perform control over the same kind of devices 14 that belong to the other device group 15.

The operation mode determination unit 11, for example, corresponds to a program stored in a memory and determines an operation mode when a failure is detected. If the operation mode determination unit 11 has been notified of the failure of a device by the error detection mechanism 13, the operation mode determination unit 11 judges which mode should be selected, a system-down mode or a dynamic degeneracy mode, by automatically judging a variety of conditions, such as the redundancy, the importance of the device, whether a driver for performing control over the device supports the operation when the device is severed, etc.

This operation mode determination unit 11 includes a confirmation unit 21, a device group judgment unit 22, a device control unit judgment unit 23, a device judgment unit 24 and a setting unit 25.

The device group judgment unit 22 automatically determines which mode should be selected, a system-down mode or a dynamic degeneracy mode in units of device groups affected by the failed device.

In this case, the device group judgment unit 22 judges which mode should be selected, by comprehensively confirming a variety of conditions, such as the redundancy and importance of each device that belongs to a device group affected by the failed device, whether a device control unit for performing control over the device supports the operation when the device is severed, etc., for each device group. In this way, a damage due to severing a device group by mistake can be prevented.

The device control unit judgment unit 23 judges which mode should be selected in units of device control units, by automatically confirming a variety of conditions, such as whether a device control unit for performing control over the device supports the operation when the device is severed, etc., for each device group.

The device judgment unit 24 judges which mode should be selected, in units of devices by automatically confirming a variety of conditions, such as the redundancy and importance, etc., of a device for each device.

The confirmation unit 21 checks whether another device is affected by the failed device when a judgment is made in units of device control units or devices, for devices that belong to a device group. In the dynamic degeneracy mode, devices to be affected must be severed together with the failed device.

If a system-down mode is not selected in the judgment of all devices to be affected and it is confirmed that no other device is affected, a dynamic degeneracy mode is selected. If another device is affected, the judgment process of a subsequent device is executed.

If even one device does not support the operation when a device control unit for performing control over the device is severed or if even one device cannot continue the operation of the system when being severed, a system-down mode is selected to prevent an erroneous operation due to the severance.

The setting unit 25 sets, for example, an operation mode designated by the system manager, in a memory. In this way, the system manager can judge by which mode the system should be operated, a system-down mode or a degeneracy mode.

In order to reduce the load on the system manager, usually there is no need for the system manager to make a setting. However, if the system manager judges that he/she should modify an operation mode setting, for example, judges that poor operation is caused by an automatically determined operation mode, etc., the system manager can modify the setting using the setting unit 25.

The setting unit 25 includes a device-group setting unit 26, a device control unit setting unit 27 and a device setting unit 28.

The device-group setting unit 26 sets an operation mode in units of device groups affected by a failed device. The system manager can determine a mode to be selected in units of device groups, using this unit.

The device control unit setting unit 27 sets an operation mode in units of device control units. The system manager can determine a mode to be selected in units of device control units using this unit.

The device setting unit 28 sets an operation mode in units of devices. The system manager can determine a mode to be selected in units of devices using this unit.

Next, the operation of the information-processing device shown in FIG. 2 is described in detail with reference to FIGS. 3 through 10.

Figure 3:
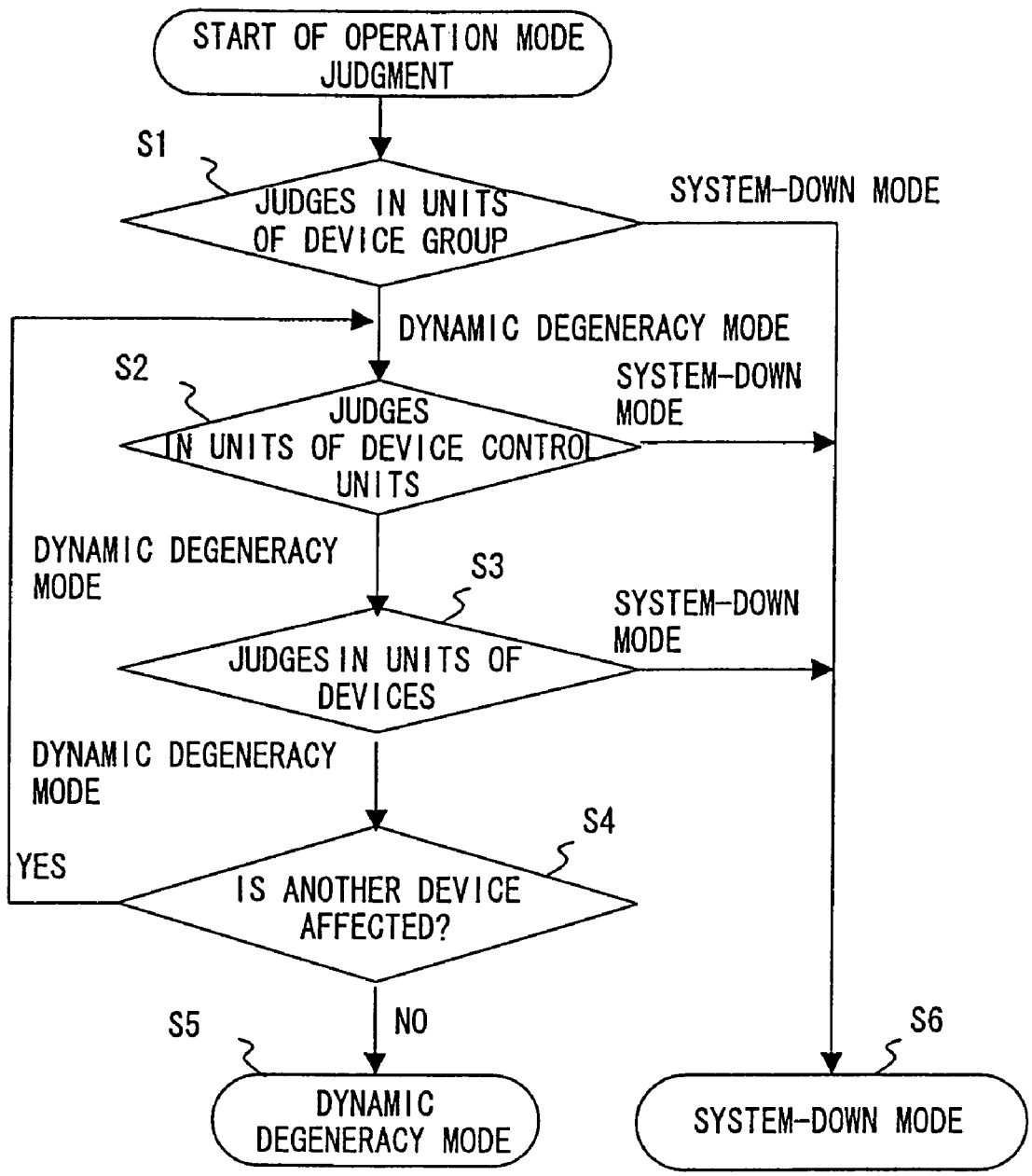
FIG. 3 is a flowchart showing an operation mode judgment process.

FIG. 3 is a flowchart showing an operation mode judgment process by the operation mode determination unit 11. This process starts when the operation mode determination unit 11 is notified of the detection of a failure from the error detection mechanism 13.

First, the device-group judgment unit 22 judges an operation mode in units of device groups affected by a failed device (step S1). If a dynamic degeneracy mode is selected in step S1, the device control unit judgment unit 23 selects an operation mode in units of device control units of devices that belong to the device group (step S2). If a dynamic degeneracy mode is selected in step S2, the device judgment unit 24 selects the operation mode in units of devices that belong to the device group (step S3).

If a dynamic degeneracy mode is selected in step S3, the confirmation unit 21 checks whether a failed device (step S4) affects another device in the device group. For example, if there is a failure in an I/O bus, all devices connected to the I/O bus are affected by the failed device.

If another device is affected, the operation mode determination unit 11 repeats the processes in steps S2 and after, for a subsequent device. If in step S4 no other device is affected, the operation mode becomes a dynamic degeneracy mode (step S5). If a system-down mode is selected in steps S1, S2 or S3, the operation mode becomes a system-down mode (step S6).

Figure 4:
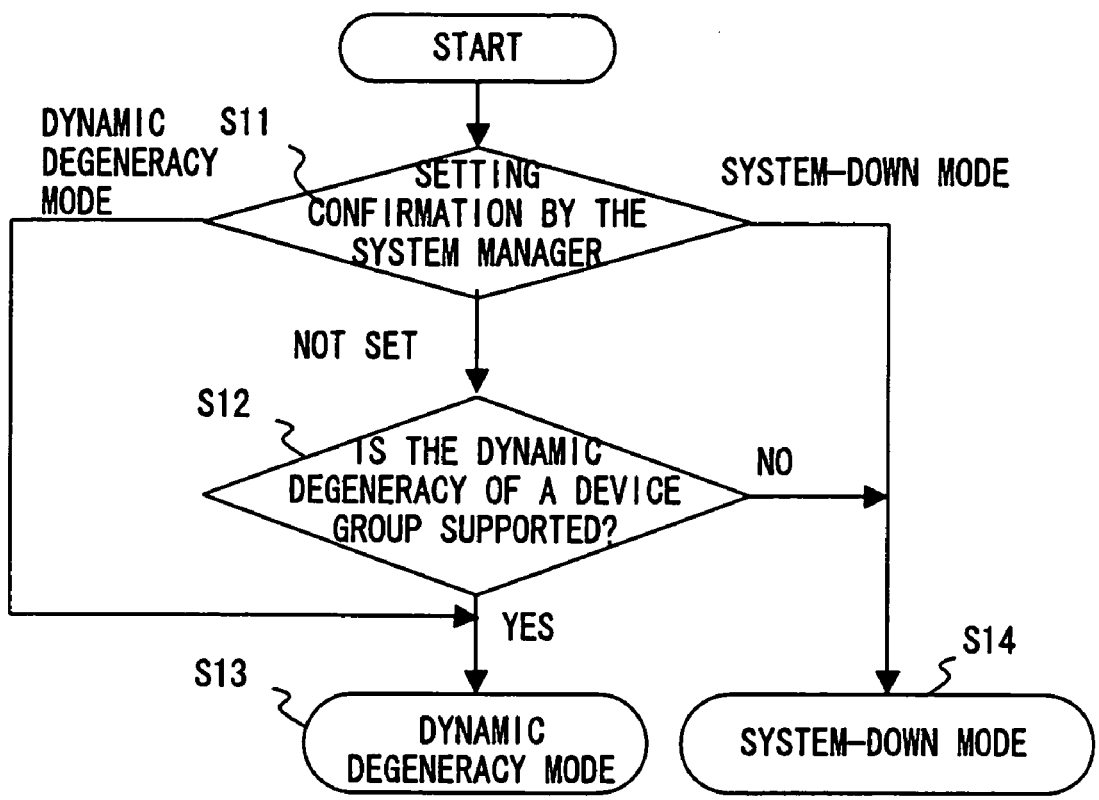
FIG. 4 is a flowchart showing the first judgment process in units of device groups.

FIG. 4 is a flowchart showing a judgment process in units of device groups of step S1 shown if FIG. 3. The device-group judgment unit 22 first confirms information set by the device-group setting unit 26 of a device group affected by a failed device (step S11). If a dynamic degeneracy mode is set, the device-group judgment unit 22 selects a dynamic degeneracy mode (step S13). If a system-down mode is set, the device-group judgment unit 22 selects a system-down mode (step S14).

If the device-group setting unit 26 does not set an operation mode, whether the entire device group supports dynamic degeneracy is automatically checked (step S12).

For example, this is confirmed by referring to information of the device group as shown in FIG. 5. For example, offline-enable shown in FIG. 5 is included in the property of the device group stored in a memory. If the value is "0", a system-down mode is indicated. If the value is "1", it is indicated that the device group can be severed.

The value of offline-enable is set taking into consideration a variety of conditions of the device group, such as the redundancy and importance of each device that belongs to a device group affected by a failed device, whether a device control unit for performing control over the device supports the operation when the device is severed, etc.

If offline-enable="1", the device group judgment unit 22 judges that dynamic degeneracy is supported and selects a dynamic degeneracy mode (step S13). If offline-enable="0" or no offline-enable is set, the device group judgment unit 22 judges that dynamic degeneracy is not supported and selects a system-down mode (step S14).

Figure 6:
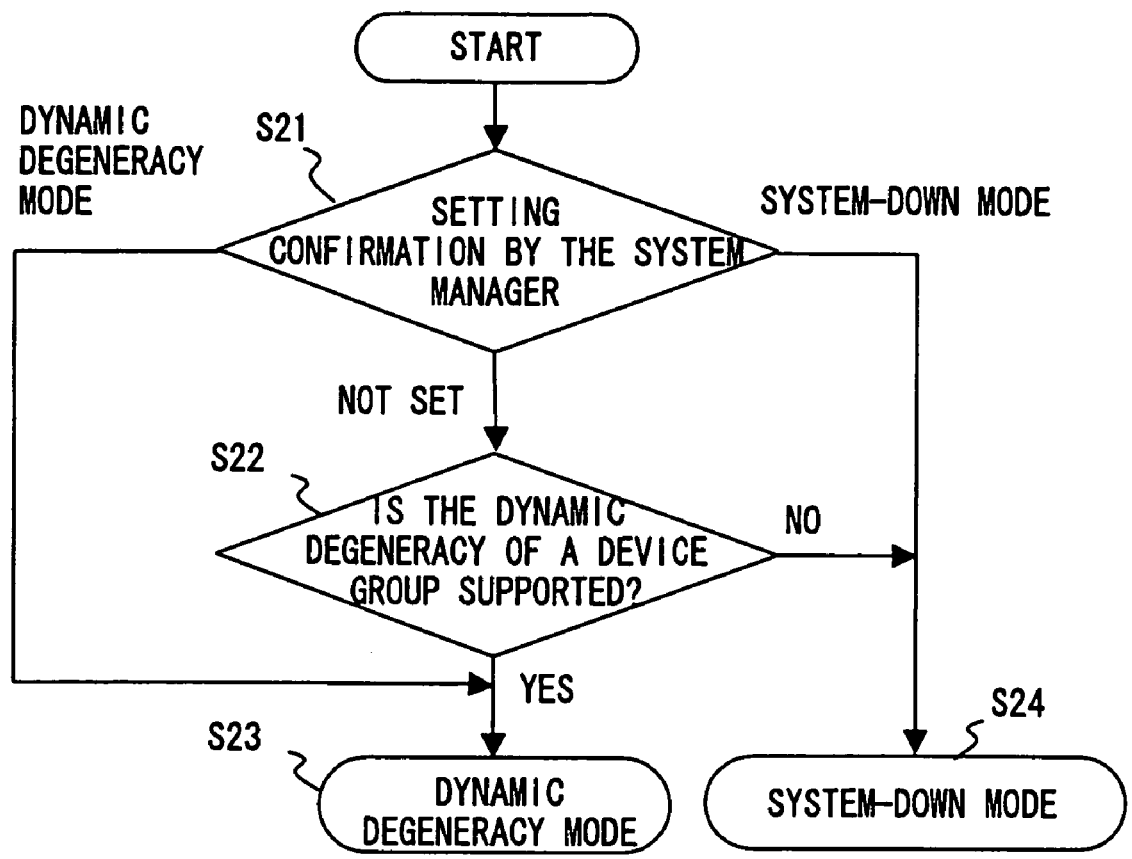
FIG. 6 is a flowchart showing the first judgment process in units of device control units.

FIG. 6 is a flowchart showing a judgment process in units of device control units in step S2 shown in FIG. 3. The device control unit judgment unit 23 first confirms information set by the device control unit setting unit 27 (step S21). If a dynamic degeneracy mode is set, the device control unit judgment unit 23 selects a dynamic degeneracy mode (step S23) and if a system-down mode is set, the unit selects a system-down mode (step S24).

If no operation mode is set by the device control unit setting unit 27, whether the device control unit supports dynamic degeneracy is automatically checked (step S22).

For example, this is confirmed by referring to information of the device control unit as shown in FIG. 7. Reg-access-check-enable shown in FIG. 7 is, for example, included in the property of the device control unit stored in a memory. If this value is "00", a system-down mode is indicated. If the value is "10", it is indicated that a device controlled by this device control unit can be severed. If the value is "11", it is indicated that the device can be severed and a pseudo-interrupt is available for the device control unit. A pseudo-interrupt means an interrupt from another program to the device control unit.

The value of reg-access-check-enable is set taking into consideration a variety of conditions of the device control unit, such as whether the device control unit for performing control over the device supports the operation when the device is severed, etc.

If reg-access-check-enable="10" or "11", the device control unit judgment unit 23 judges that dynamic degeneracy is supported and selects a dynamic degeneracy mode (step S23). If reg-access-check-enable="00" or no reg-access-check-enable is set, the unit 23 judges that dynamic degeneracy is not supported and selects a system-down mode (step S24).

FIG. 8 is a flowchart showing a judgment process in units of devices in step S3 shown in FIG. 3. The device judgment unit 24 first confirms information set by the device setting unit 28 (step S31). If a dynamic degeneracy mode is set, the device judgment unit 24 selects a dynamic degeneracy mode (step S33).

If the device setting unit 28 does not set an operation mode, the device judgment unit 24 confirms the redundancy of the device (step S32). For example, this is confirmed by checking the number of the same units in the system. If the existence of the replacement device is confirmed, for example, if there are a plurality of such devices, the device judgment unit 24 selects a dynamic degeneracy mode (step S33).

However, if it is confirmed that the device is the only device of such a kind and there is no replacement, the device judgment unit 24 checks whether the operation of the system can be continued when the device is severed (step S34).

Figure 9:
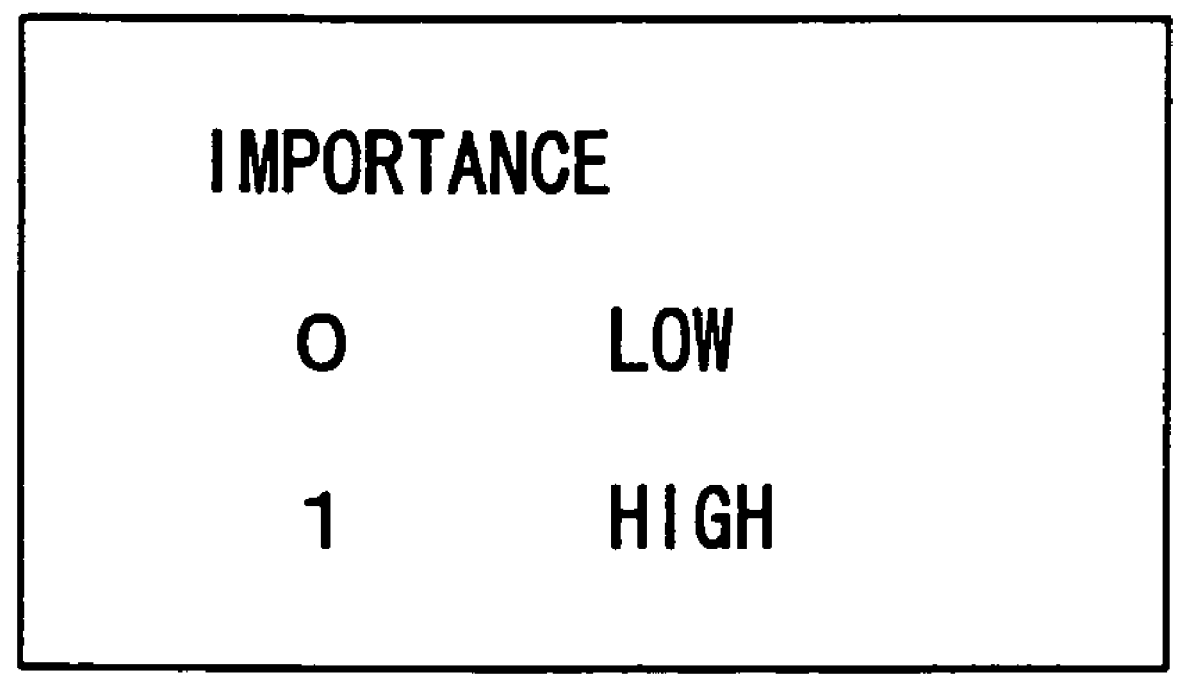

For example, this is confirmed by referring to flags, as shown in FIG. 9. For example, the importance flag shown in FIG. 9 is included in the property of the device stored in a memory. If the value is "0", it is indicated that the importance is low. If the value is "1", it is indicated that the importance is high.

If the value of the importance flag is "0", the device judgment unit 24 judges the operation of the system can be continued, and selects a dynamic degeneracy mode (step S33). If the value is "1", the unit 24 judges that the operation of the system cannot be continued because of the high importance of the device, and checks whether the device is currently used in the system (step S35).

Figure 10:
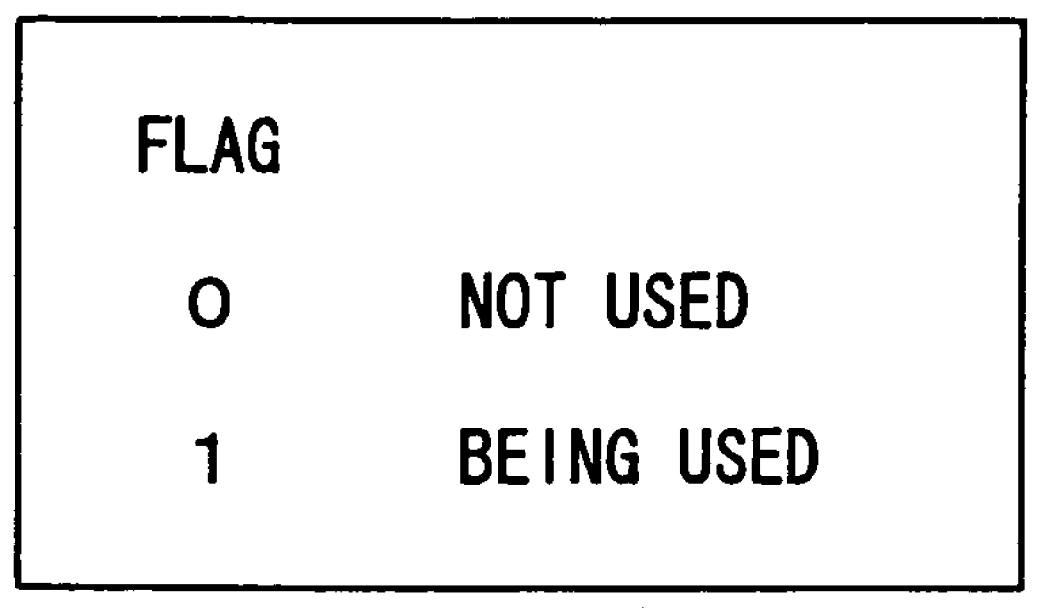

For example, this is confirmed by referring to flags, as shown in FIG. 10. For example, the state flag shown in FIG. 10 is included in the property of the device. If the value is "0", it is indicated that the device is not being used. If the value is "1", it is indicated that the device is being used.

Since the device is not currently being used if the value of the state flag is "0", the device judgment unit 24 judges that the device can be severed although the importance of the device is high, and selects a dynamic degeneracy mode (step S33). If the value is "1", the unit 24 judges that the device is currently being used and cannot be severed, and selects a system-down mode (step S36).

If in step S31 a system-down mode is set, the device judgment unit 24 executes the judgment in step S35. If the device is not currently being used, the unit 24 selects a dynamic degeneracy mode (step S33), and if the device is being used, the unit 24 selects a system-down mode (step S36).

According to the operation mode judgment process described above, if there is even one device in which a system-down mode is selected in units of device control units in a device group affected by a failed device, the operation mode becomes a system-down mode. If there is even one device in which a system-down mode is selected in units of devices, the operation mode becomes a system-down mode.

Specifically, if there is even one device in which a system-down mode is selected in units of device control units or devices, the operation mode becomes a system-down mode.

Therefore, if even one device control unit in a device group to be simultaneously severed does not support the operation when the device is severed or cannot continue the operation of the system, the severance of the device can be prevented from occurring.

Since a dynamic degeneracy mode is selected as often as possible, a highly reliable system can be implemented. However, if it is found that a dynamic degeneracy mode is not applicable, by automatically confirming the conditions of both a device control unit for performing control over devices in the device group and the device, a system-down mode is selected. Therefore, a damage due to the severance of the device by mistake can be prevented.

Since an operation mode is determined for each failed part, a system can be configured in such a way that a system that supports dynamic degeneracy and a system that does not support dynamic degeneracy can co-exist.

Figure 11:
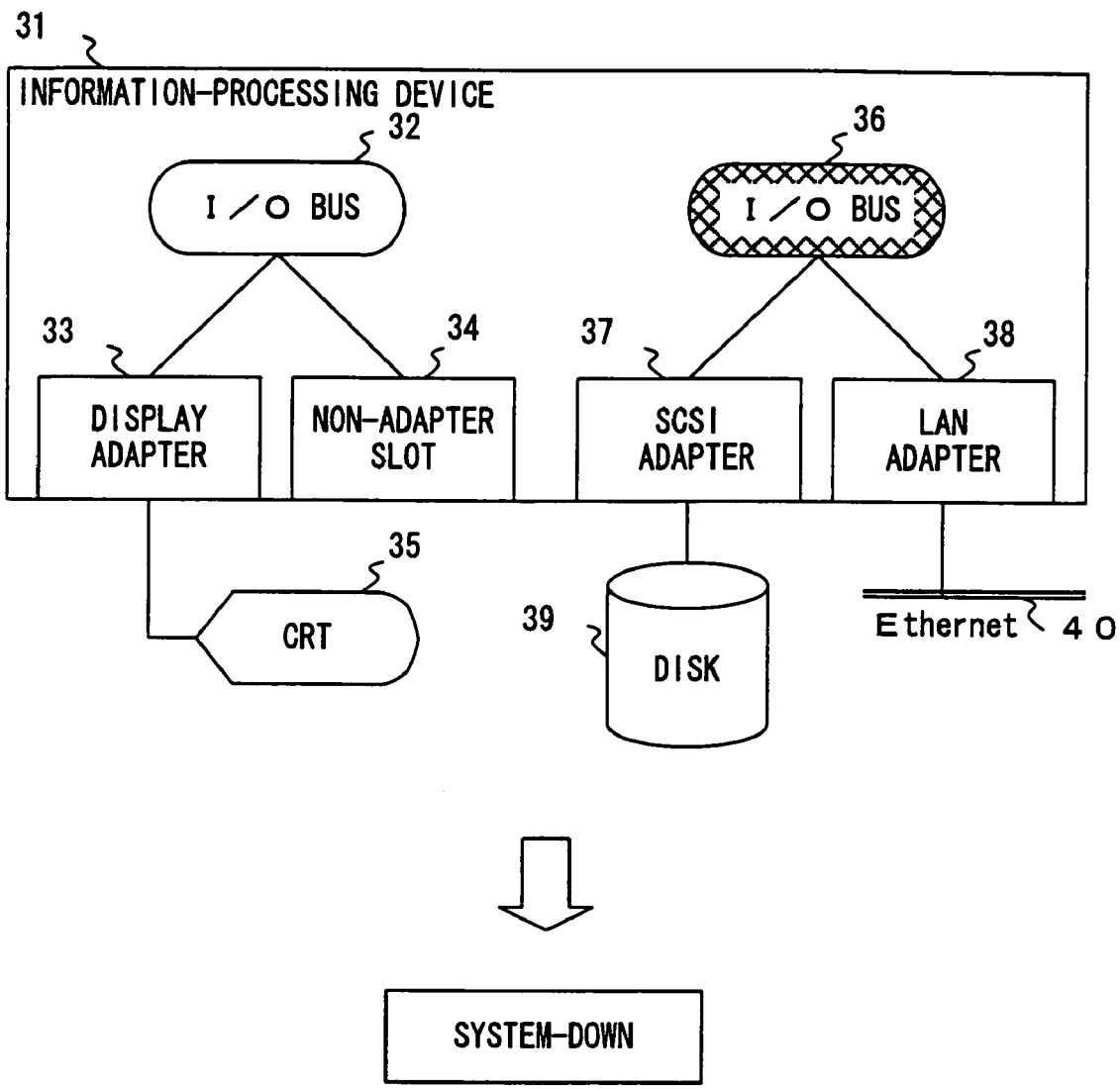
FIG. 11 shows the first system.
Figure 12:
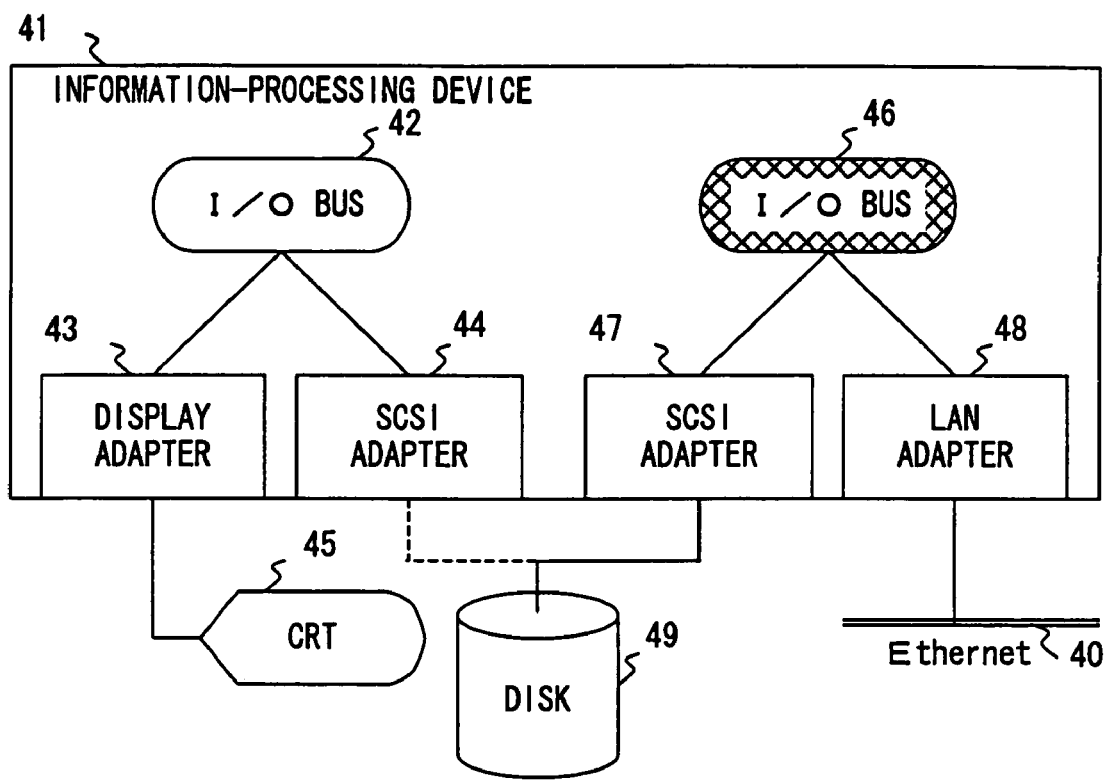
FIG. 12 shows the second system.
Figure 13:
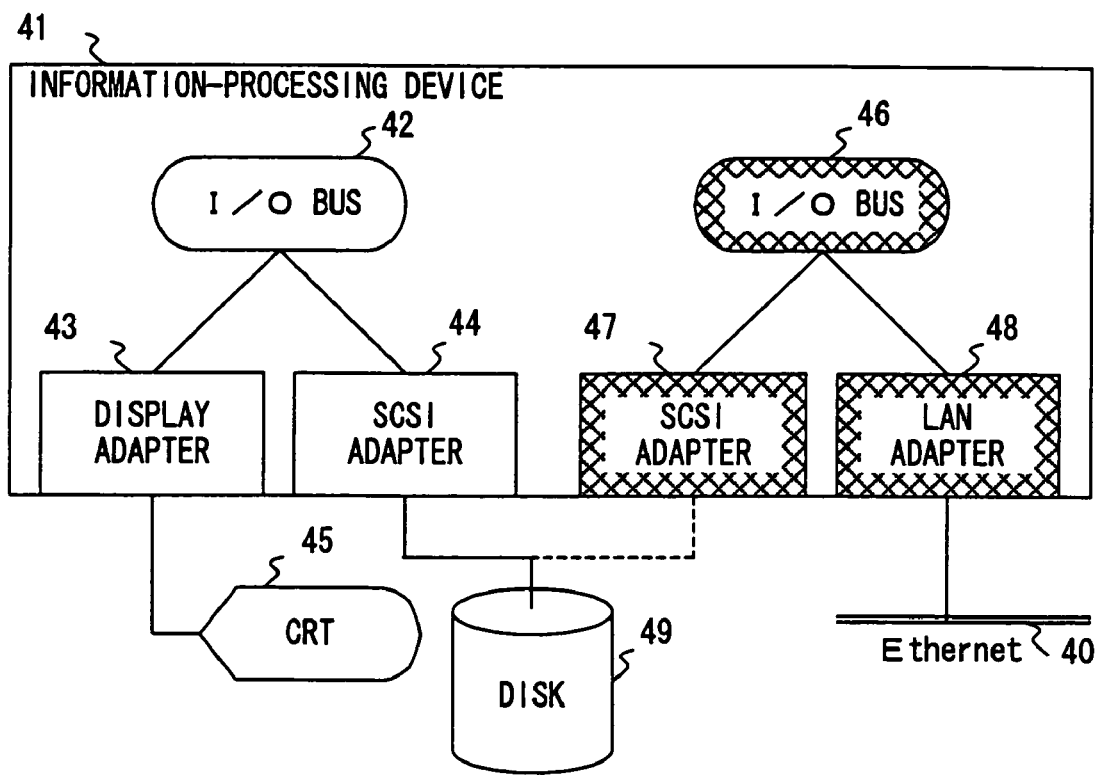
FIG. 13 shows a dynamic degeneracy.

Next, the operation mode judgment process is described using specific examples of a computer system with reference to FIGS. 11 through 13.

FIG. 11 shows an example of a system in which a system-down mode is applied. In FIG. 11, an information-processing device 31 (computer main body) comprises an I/O bus 32, a display adapter 33, a non-adapter slot 34, an I/O bus 36, a SCSI (small computer system interface) adapter 37 and a LAN (local area network) adapter 38.

The display adapter 33 and non-adapter slot 34 are connected to the I/O bus 32. The SCSI adapter 37 and LAN adapter 38 are connected to the I/O bus 36. The slot 34 is not provided with an adapter.

A CRT (cathode-ray tube) display 35 is connected to the display adapter 33, a disk 39, which is an external storage device, is connected to the SCSI adapter 37 and an Ethernet 40 is connected to the LAN adapter 38.

If in this system there is an unrestorable failure in the I/O bus 36, both the SCSI adapter 37 and LAN adapter 38 that are connected to the I/O bus 36 are affected by the failure of the I/O bus 36. Therefore, the I/O bus 36, SCSI adapter 37 and LAN adapter 38 are regarded as one device group. Accordingly, in a dynamic degeneracy mode, these devices must be simultaneously severed.

A bus control unit for performing control over the I/O bus 36, which is not shown in FIG. 11, manages devices connected to the I/O bus 36, in a memory and recognizes that both the SCSI adapter 37 and LAN adapter 38 are affected by the failure of the I/O bus 36. A multi-path control unit for switching paths, which is not shown in FIG. 11, manages a path via which the information-processing device 31 can access the DISK 39, in a memory.

In FIG. 11, a path via which the information-processing device can access the disk 39 is only a path via the SCSI adapter 37. Therefore, if the SCSI adapter 37 is severed and cannot be used, the information-processing device cannot access the disk 39.

If the disk 39 is a very important device for the system, the operation of the system cannot be continued when the device group of the I/O bus 36, including the SCSI adapter 37, is severed. Therefore, if there is an unrestorable failure in the I/O bus 36, a system-down mode is selected and dynamic degeneracy is not performed.

In this case, the device-group judgment unit 22 judges the device group of the I/O bus 36 according to the flowchart shown in FIG. 4. Then, in step S12, the unit 22 judges that a dynamic degeneracy mode is supported.

The device control unit judgment unit 23 judges the driver of the I/O bus 36, driver of the SCSI adapter 37 and driver of the LAN adapter 38 according to the flowchart shown in FIG. 6. Then, in step S22, the unit 23 judges that the drivers support a dynamic degeneracy mode.

The device judgment unit 24 judges the SCSI adapter 37 according to the flowchart shown in FIG. 8. Then, in step S32 the unit 24 judges that the adapter has no redundancy, in step S34 it judges that the operation of the system cannot be continued, in step S35 it judges that the adapter is being used and selects a system-down mode.

FIG. 12 shows an example of a system in which a dynamic degeneracy mode is applied. In FIG. 12, an information-processing device 41 (computer main body) comprises an I/O bus 42, a display adapter 43, a SCSI adapter 44, an I/O bus 46, a SCSI adapter 47 and a LAN adapter 48.

The display adapter 43 and SCSI adapter 44 are connected to the I/O bus 42. The SCSI adapter 47 and LAN adapter 48 are connected to the I/O bus 46.

A CRT display 45 is connected to the display adapter 43, a disk 49, which is an external storage device, is connected to the SCSI adapters 44 and 47 and an Ethernet 40 is connected to the LAN adapter 48.

If in this system there is an unrestorable failure in the I/O bus 46, the I/O bus 46, SCSI adapter 47 and LAN adapter 48 must be simultaneously severed as one device group for the same reason as that of the system shown in FIG. 11.

However, in FIG. 12, there are two paths: a path via the SCSI adapter 44 and a path via the SCSI adapter 47 as paths via which the information-processing device 41 can access the disk 49. Therefore, even when there is a failure and the device 41 accesses the disk 49 using the SCSI adapter 47, the device 41 can continue accessing the disk 49 by switching a path in such a way that the device can access the disk 49 using the SCSI adapter 44.

Since in this system there is not much need to access the Ethernet 40 and the importance of the LAN adapter 48 is low, the operation of the system can be continued even if the LAN adapter 48 is severed. Therefore, if there is an unrestorable failure in the I/O bus 46, a dynamic degeneracy mode is selected and a system-down is avoided.

In this case, both the device-group judgment unit 22 and device control unit judgment unit 23 perform the same judgment as that of the system shown in FIG. 11.

The device judgment unit 24 first judges the SCSI adapter 47 according to the flowchart shown in FIG. 8. Then, in step S32, the unit 24 judges the adapter has been duplicated and selects a dynamic degeneracy mode. Next the unit 24 judges the LAN adapter 48. Then in step 32, the unit 24 judges that the adapter has not been duplicated. Then, in step S34, the unit 24 judges that the operation of the system can be continued and selects a dynamic degeneracy mode.

In this way, as shown in FIG. 13, the device group of the I/O bus 46, including the SCSI adapter 47, is dynamically severed from the system, a path via which the disk 49 is accessed is switched to a path via the SCSI adapter 44 and the operation of the system is continued.

According to the preferred embodiment described above, when a failure is detected in a device during the operation of the system, the mode that should be selected, a system-down mode to immediately stop the system to prevent an erroneous operation or a dynamic degeneracy mode to sever a failed device from the system and to continue the operation of the system, can be automatically judged.

In this case, since a dynamic degeneracy mode is selected as often as possible, a highly reliable system can be implemented. Since a variety of conditions of the device, device control unit, etc., are automatically checked, damage due to the severance of a device by mistake can also be prevented.

If there is no specific setting made by the system manager, an operation mode is automatically determined. Therefore, a time required for the setting can be reduced and the number of wrong settings can be reduced. The system manager can modify an operation mode in units of device groups/device control units/devices, if required by the operating conditions of a system. Therefore, a flexible operation can be implemented.

Figure 14:
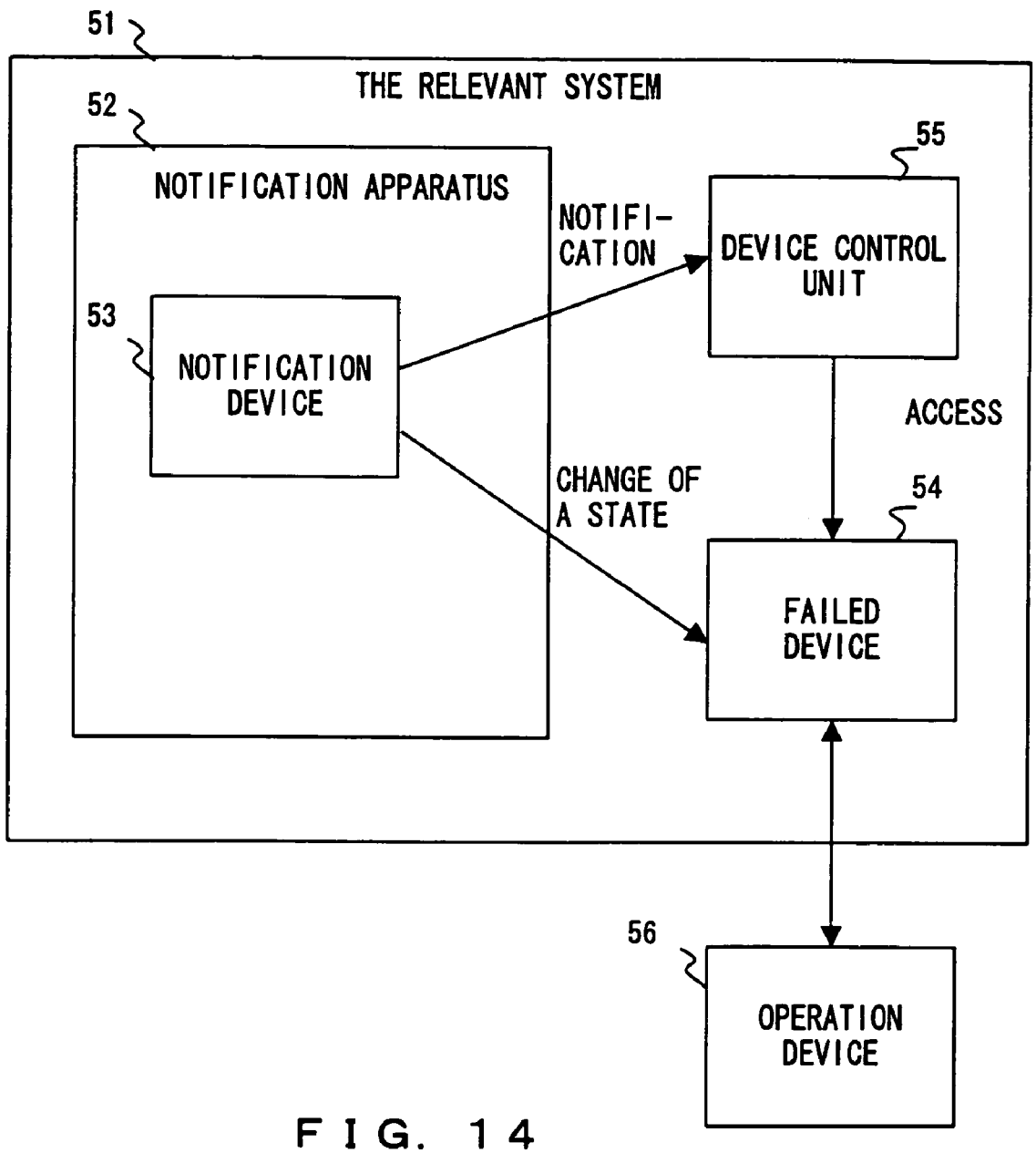
FIG. 14 shows the basic configuration of the notification apparatus of the present invention.

FIG. 14 shows the basic configuration of the notification apparatus of the present invention. The notification apparatus 52 shown in FIG. 14 is installed in the relevant system 51 and comprises a notification device 53.

In the first aspect of the present invention, when there is a failure in a system 51 and the use of a failed device 54 is prohibited, the notification device 53 notifies a device control unit 55 of the prohibition of the use of the device 54 by making the device control unit 55 for performing control over the device 54 access the device 54.

When the device 54, the use of which is prohibited, is severed from the system 51, the notification device 53 makes the device control unit 55 perform normal access to the device 54. In this case, since the device control unit 55 cannot access the device 54, the unit 55 recognizes that the use of the device 54 is prohibited.

As described above, the first subject matter of the present invention is to enable a device control unit to access a failed device when the use of the device is prohibited.

In the second aspect of the present invention, when there is a failure in a system 51 and the use of a failed device 54 is prohibited, the notification device 53 changes the state of the device 54 to a state where another system 56 related to the device 54 can recognize that the use of the device 54 is prohibited.

If the device 54 the use of which is prohibited is severed from the system 51, the notification device 53 compulsorily changes the state of the device 54, for example, by initializing the device 54. In this case, the system 56 recognizes that the use of the device 54 is prohibited, by referring to the changed state of the device 54.

As described above, the second subject matter of the present invention is to change the state of a failed device to a state where the prohibition of the use of the device can be recognized when the use of the device is prohibited.

According to such a notification apparatus, even a system with no specific interface for reporting the severance of a failed device can immediately notify a notification destination, such as a device control unit, another system, etc., of the severance of the failed device. Therefore, an erroneous operation due to no recognition of the severance can be prevented.

For example, the notification device 53 shown in FIG. 14 corresponds to a severance notification unit 64 shown in FIG. 15, which is described later.

If the information-processing device in the second preferred embodiment of the present invention detects a failure in a device (component) during the operation of the system using an error detection mechanism, the device notifies a notification destination of the severance of the device without exchanging an existing interface with another interface. The second preferred embodiment also includes a driver interface for implementing a dynamic degeneracy function and a control method thereof.

According to such a configuration, even a system without a specific interface for reporting the severance of a failed device can immediately notify a notification destination of the severance of the failed device. Therefore, an erroneous operation due to no recognition of the severance can be prevented.

Using an existing interface without exchanging it with another interface can minimize the influence on a driver and thereby an open system with a dynamic degeneracy function can be easily organized.

If there is a failure in a specific device and the device in a dynamic degeneracy mode affects another device, devices affected by the device should be simultaneously severed. For example, if a plurality of I/O (input/output) devices are connected to a specific I/O bus and the I/O bus fails, all I/O devices connected to the failed I/O bus must be simultaneously severed.

In this case, a driver must be notified of the severance of some failed devices to be simultaneously severed and other failed devices need not notify the driver of the severance, depending on the specification of the driver for performing control over the device, the state of the device, etc. If notification of the severance is not required, there is also a possibility that an erroneous operation may be caused by the notification.

In this case, it can be automatically judged which driver should be notified of the severance of a failed device, by judging a variety of conditions of a device affected by the failed device or its driver. In this way, each driver is notified of the severance, if required. Therefore, an erroneous operation caused by notifying a driver of the severance by mistake can be prevented.

An erroneous operation due to no recognition of the severance of a failed device can be prevented by notifying an application software program that is operating in another computer system without a special interface, but related to the failed device, of the severance of the failed device.

FIG. 15 shows the configuration of the information-processing device in the second preferred embodiment. The information-processing device 60 shown in FIG. 15 (own system) comprises a confirmation unit 61, an external notification unit 62, a notification judgment unit 63, a severance notification unit 64, a plurality of device control units 12, error detection mechanisms 13 accompanying each device control unit 12 and devices 14 controlled by device control units 12.

The device 14 is an external storage device, such as an I/O bus, a display adapter, a display, a SCSI adapter, a network communication adapter, a hard disk, etc.

The error detection mechanism 13 detects the failure of a device 14. The information-processing device 60 prohibits access to the failed device 14 and devices 14 affected by the failed device and severs those devices from the system.

The notification judgment unit 63, for example, corresponds to a program stored in a memory, and when the device 14 is severed from the information-processing device 60, the unit 63 judges whether the device control unit 12 should be notified of the severance of the device 14.

In this case, whether the severance of the device should be reported can be automatically judged by confirming a variety of conditions, such as the specification of a device control unit, the state of the device, etc. If it is judged that notification is required, the notification judgment unit 63 instructs the severance notification unit 64 to issue notification. If it is judged that notification is not required, notification is not instructed.

The severance notification unit 64, for example, corresponds to a program stored in a memory, and when notification is issued, the severance notification unit 64 notifies a device control unit of the severance of a device. Even a system without a special interface for reporting the severance can notify a device control unit of the severance of a device by using an existing interface.

The severance notification unit 64 includes a pseudo-interrupt issuance unit 81 and an access instruction issuance unit 82 as notifying means.

The pseudo-interrupt issuance unit 81 calls up the interrupt process of a device control unit by issuing a pseudo-interrupt to the device control unit. By making a pseudo-interrupt, the interrupt handler (interrupt entry) of a device control unit can be called up in the same procedure as that of a true interrupt.

A true interrupt means the call-up of an interrupt process from a device to be severed, and a pseudo-interrupt means the call-up of an interrupt process caused by an interrupt other than a true interrupt. For the pseudo-interrupt, for example, software interrupt caused by execution of the internal interrupt instruction of a CPU (central processing unit) can be considered.

For example, in the case of a system notifying a device control unit of the severance of a device by prohibiting access to a failed device, if the interrupt handler is activated/executed, the interrupt handler detects an access error when accessing the device. In this way, the device control unit can immediately recognize the severance of the device.

The access instruction issuance unit 82 calls up the corresponding access process (entry) of the device control unit by intentionally issuing an access instruction, such as the read process, write process, open process, etc., of a device. By intentionally issuing an access instruction, an entry, such as the read entry, write entry, open entry, etc., of the device control unit can be called up.

For example, in the case of a system adopting a method of notifying a device control unit of the severance of a device by prohibiting access to a failed device, if the read entry, write entry or open entry is activated/executed, the executed entry detects an access error when accessing the device. In this way, the device control unit can immediately recognize the severance of a device.

In this way, by using the pseudo-interrupt issuance unit 81 or access instruction issuance unit 82, the conventional interrupt interface can be used without exchanging it, and even a system without a special interface can notify a device control unit of the severance of a device.

The notification judgment unit 63 includes a device-group judgment unit 71, a device control unit judgment unit 72, a device judgment unit 73 and a setting unit 74.

The device-group judgment unit 71 automatically judges whether the severance of a device should be reported in units of device groups affected by a failed device, by comprehensively confirming a variety of conditions of a device group, such as the state of each device that belongs to the device group affected by the failed device, by the specification of a device control unit for performing control over the device, etc. If it is judged that the report to the device group is not required, a device control unit that performs control over devices in the device group is not notified of the severance.

The device control unit judgment unit 72 automatically judges whether the severance of a device should be reported in units of device control units, by confirming a variety of conditions, such as the current state, specification, etc., of a device control unit that controls the device, for each device control unit. If it is judged that notification to a specific device control unit is not required, the device control unit is not notified of the severance.

The device judgment unit 73 automatically judges whether the severance of a device should be reported in units of devices, by confirming a variety of conditions, such as the current state, state of use, etc., of each device, for each device. If it is judged that the notification to a specific device is not required, a device control unit that performs control over the device is not notified of the severance.

The setting unit 74 sets information designated by the system manager, for example, in a memory. In this way, the system manager can judge whether the severance of a device should be reported and can perform the setting.

In order to reduce the load on the system manager, usually there is no need for the system manager to make a setting. However, if the system manager judges that he/she should modify a setting of notification, for example, if poor operation is caused by an automatically determined judgment, etc., the system manager can modify the setting using the setting unit 74.

The setting unit 74 includes a device-group setting unit 75, a device control unit setting unit 76 and a device setting unit 77.

The device-group setting unit 75 sets whether the severance should be reported in units of device groups affected by a failed device. The system manager can determine whether the severance should be reported in units of device groups, using this unit.

The device control unit setting unit 76 sets as to whether the severance should be reported, in units of device control units. The system manager can judge whether the severance should be reported, in units of device control units and can perform the setting using this unit.

The device setting unit 77 sets as to whether the severance should be reported, in units of devices. The system manager can judge whether the severance should be reported, in units of devices and can perform the setting using this unit.

The confirmation unit 61, for example, corresponds to a program stored in a memory, and when judging devices that belong to the device group in units of device control units or devices, the unit 61 checks whether another device is affected by a failed device. Since devices affected by the failed device are severed together with the failed device at the time of dynamic degeneracy, there is a high possibility that the notification of the severance to a device control unit that performs control over the device may also be required.

When it is confirmed that no other device is affected, the notification process for a device control unit is completed. If it is judged that another device is affected, the judgment of a subsequent device is started.

In this way, the provision of a confirmation unit 61, a notification judgment unit 63 and a severance notification unit 64 enables the notification of the severance of a device to a device control unit that performs control over other devices simultaneously severed. Therefore, all device control units that require notification of the severance can be immediately notified of the severance.

The external notification unit 62, for example, corresponds to a program stored in a memory, and the unit 62 notifies an external system 90 of the severance of a device using an existing interface between the information-processing device 60 and another system 90. In this way, another system without a special interface for reporting the severance of a device can also be notified of the severance of the device.

Next, the operation of the information-processing device 60 shown in FIG. 15 is described in detail with reference to FIGS. 16 through 22.

Figure 16:
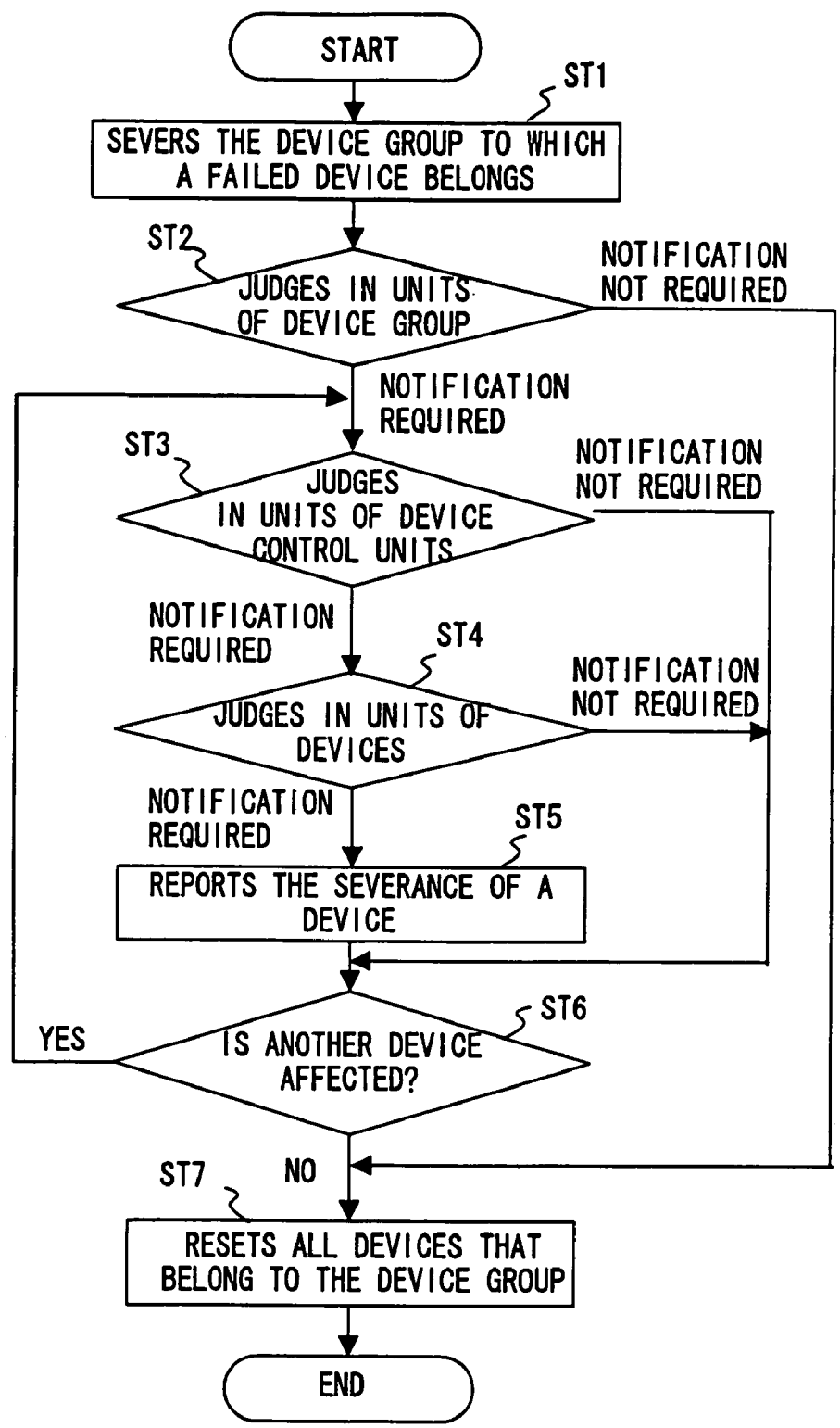
FIG. 16 is a flowchart showing a notification process.

FIG. 16 is a flowchart showing the notification process of the information-processing device 60. This process starts when the error detection mechanism 13 detects a failure.

First, the information-processing device 60 severs all devices that belong to a device group affected by a failed device (step S1). If a method of notifying a device control unit of the severance of a device by prohibiting access to the device is adopted, access to the severed device is not available after that.

For example, if there is a failure in an I/O bus, devices connected to the I/O bus, such as a display adapter, a SCSI adapter, a communication adapter, etc., are simultaneously severed.

Then, the device-group judgment unit 71 judges whether notification is required in units of device groups of the failed device (step S2). If it is judged that notification is required, the device control unit judgment unit 72 judges whether notification is required in units of device control units of devices that belong to the device group (step S3). If it is judged that notification is required, the device judgment unit 73 judges whether notification is required in units of devices that belong to the device group (step S4).

If it is judged that notification is required, the severance notification unit 64 notifies a device control unit that performs control over the device of the severance using a pseudo-offering issuance unit 81 or an access instruction issuance unit 82 (step S5) For example, if there is a failure in an I/O bus, the driver of a device connected to the failed I/O bus is notified of the severance of the device.

Then, the confirmation unit 61 checks whether the failed device (step S6) affects another device in the device group. If another device is affected, the processes in step S3 and after are repeated for a subsequent device. If in step S3 or S4 it is judged that notification is not required, a corresponding device control unit is not notified of the severance and the process in step S6 is executed.

If in step S6 no other device is affected, the external notification unit 62, for example, compulsorily resets (initializes) all devices that belong to the severed device group. In this way, since the states of those devices are changed, an application program that is operating in another system 90 related to the severed device recognizes that those devices are severed.

To reset means to perform the reset process to stop the operation of a device. If the device is reset, the application program in the system 90 makes the same reply as that made when the device stops and performs an operation made when the device stops.

For example, if the communication adapter of a network is reset, an application program that is operating in another system communicating via the adapter cuts the communications. In this way, even when the application program is executing a charging process accompanying the communications, the occurrence of an unreasonable charging can be prevented.

Figure 17:
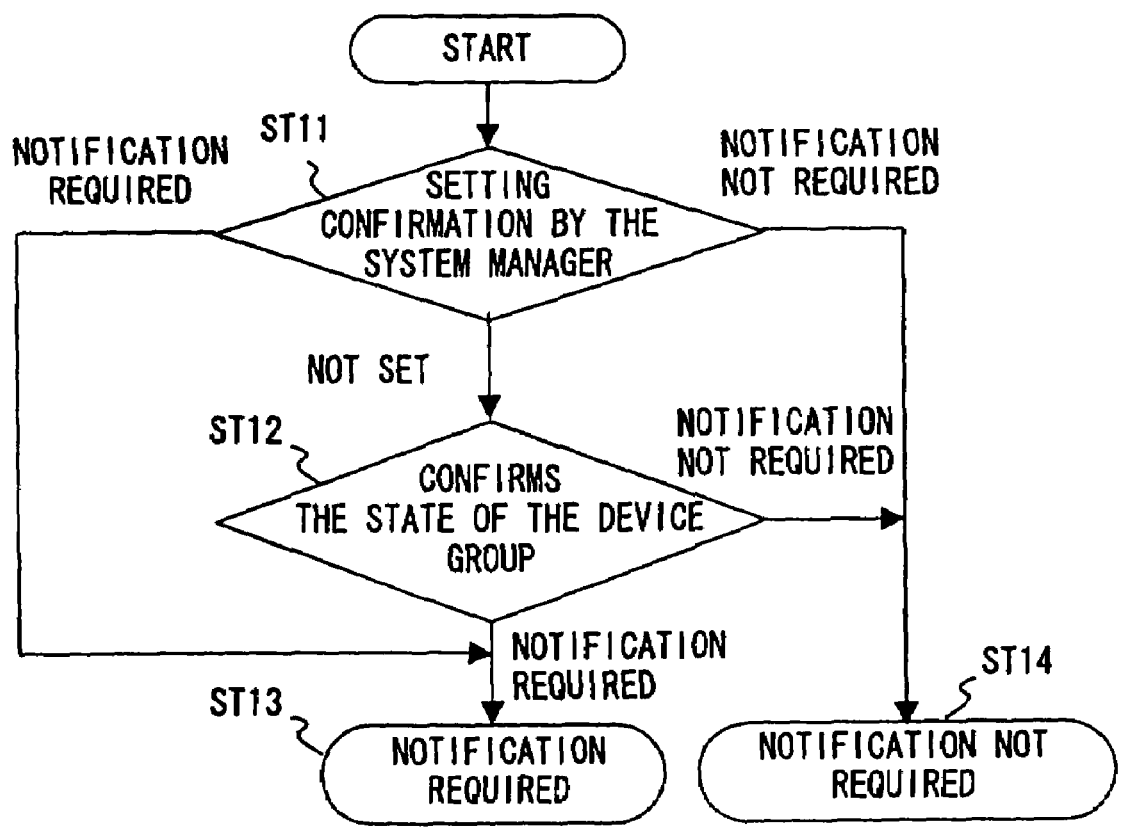
FIG. 17 is a flowchart showing the second judgment process in units of device groups.

FIG. 17 is a flowchart showing a judgment process in units of device groups in step S2 shown in FIG. 16. The device-group judgment unit 71 first confirms the information set by the device-group setting unit 75 of a device group affected by a failed device (step S11). If it is set that notification is required, the unit 71 judges that notification is required (step S13) and if is it set that notification is not required, the unit 71 judges that notification is not required (step S14).

If the device-group setting unit 75 does not set whether the notification is required, the unit 71 confirms the state of the device group (step S12). This is confirmed, for example, by referring to information of the device group as shown in FIG. 18. The offline-enable shown in FIG. 18 is included in the property of the device group stored, for example, in a memory. If the value is "0", it is indicated that the device group cannot be severed. If the value is "1", it is indicated that the device group can be severed.

The value of offline-enable is set taking into consideration a variety of conditions of the device group, such as the state of each device that belongs to the device group affected by the failed device, the specification of a device control unit that performs control over the device.

If offline-enable="1", the device-group judgment unit 71 judges that the device group is severed and judges that notification is required (step S13) If offline-enable="0" or no offline-enable is set, the unit 71 judges that the device group is not severed and judges that notification is not required (step S14).

Figure 19:
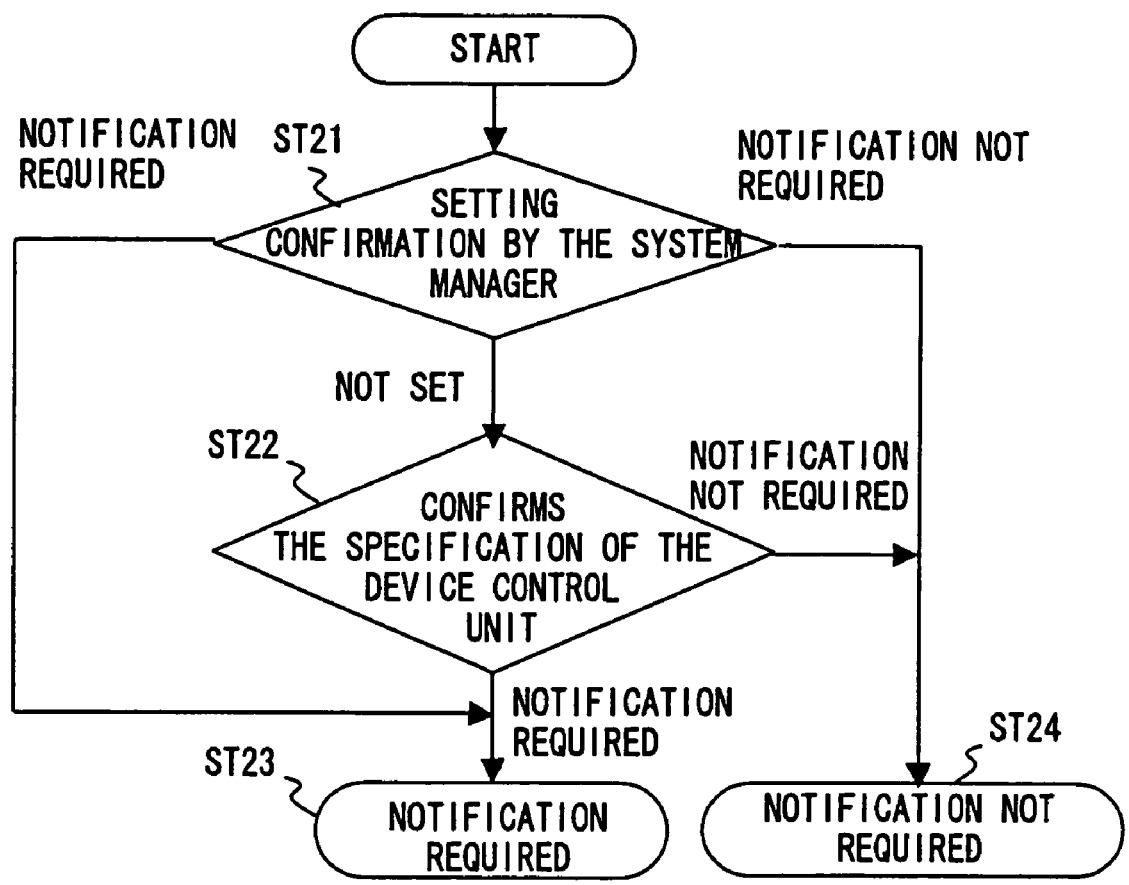
FIG. 19 is a flowchart showing the second judgment process in units of device control units.

FIG. 19 is a flowchart showing a judgment process in units of device control units in step S3 shown in FIG. 16. The device control unit judgment unit 72 first confirms information set by the device control unit setting unit 76 (step S21). If it is set that notification is required, the unit 72 judges that notification is required (step S23). If it is set that notification is not required, the unit 72 judges that notification is not required (step S24).

If whether notification is required is not set by the device control unit setting unit 76, the unit 72 confirms the specification of the device control unit (step S22). This is confirmed, for example, by referring to the information of a device control unit as shown in FIG. 20.

The reg-access-check-enable shown in FIG. 20 is included in the property of a device control unit stored, for example, in a memory. If the value is "00", it is indicated that a device controlled by the device control unit cannot be severed. If the value is "10", it is indicated that a device can be severed. If the value is "11", it is indicated that a device can be severed and a pseudo-interrupt is available for a device control unit. The value of reg-access-check-enable is set by a developer, etc., taking into consideration a variety of conditions of a device control unit.

If reg-access-check-enable="11", the device control unit judgment unit 72 judges that notification is required (step S23). If reg-access-check-enable="00" or "10", or no reg-access-check-enable is set, the unit 72 judges that notification is not required (step S24).

In FIG. 20 a case is assumed where the notification is made by the issuance of a pseudo-interrupt. If the notification is made by the issuance of access instruction, it is indicated that the device can be severed and an access can be instructed to the device control unit when reg-access-check-enable="11".

A flag for indicating the availability/non-availability of a pseudo-interrupt (or access instruction) can be set in the property of a device control unit instead of the information shown in FIG. 20, and whether notification is required can also be judged by referring to this flag.

Figure 21:
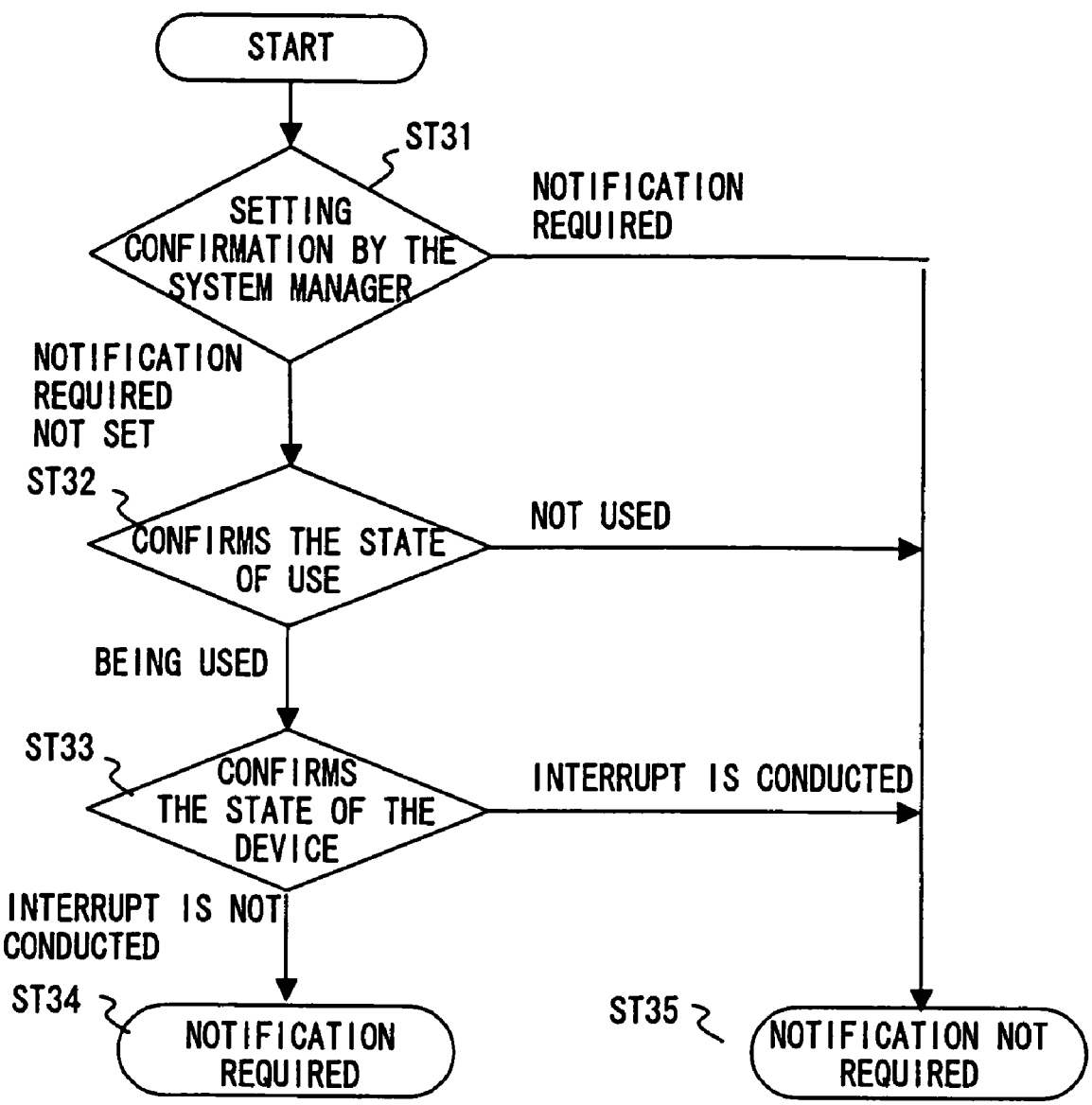
FIG. 21 is a flowchart showing the second judgment process in units of devices.

FIG. 21 is a flowchart showing a judgment process in units of devices in step S4 shown in FIG. 16. First, the unit 73 confirms information set by the device setting unit 77 (step S31). If it is set that notification is not required, the unit 73 judges that the notification is not required (step S35).

Figure 22:
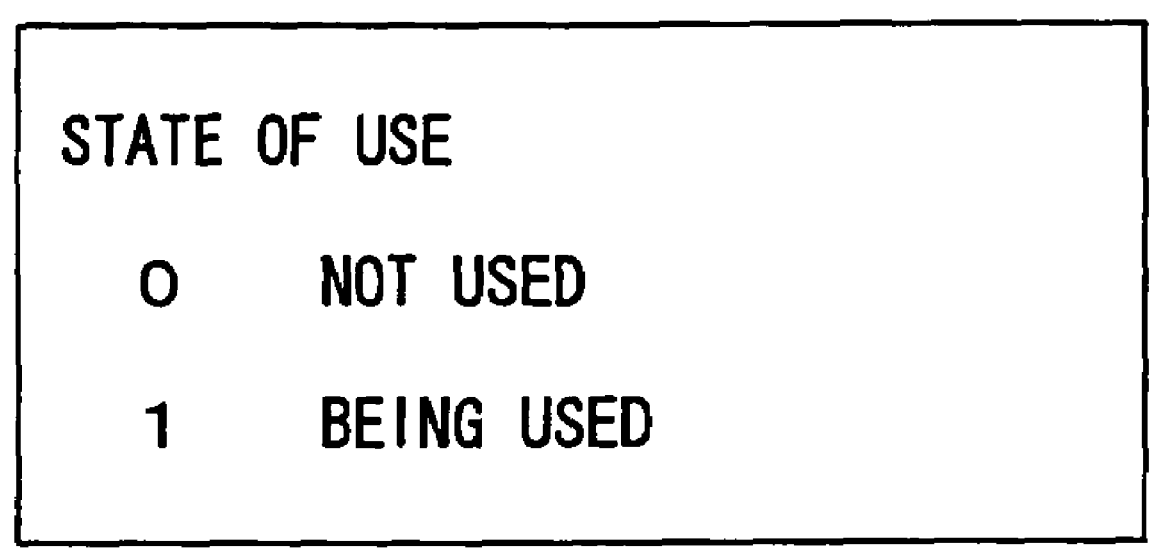

If it is set by the device setting unit 77 that notification is required or whether notification is required is not set, the unit 73 checks whether the device is currently used in the system (step S32). This is confirmed, for example, by referring to a flag as shown in FIG. 22. The using state flag shown in FIG. 22 is included in the property stored, for example, in a memory. If the value is "0", it is indicated that the device is not used. If the value is "1", it is indicated that the device is being used.

If the value of the using state flag is "0", the device judgment unit 73 judges that the notification is not required (step S35). Then, if the value of the using state flag is "1", the unit 73 checks whether a true interrupt is currently conducted in the device, by referring to the state of the device (step S33).

If an interrupt is already conducted, the unit 73 judges that there is no need to notify the device control unit of the severance and judges that notification is not required (step S35). If an interrupt is not conducted, the unit 73 judges that the device control unit has not recognized the severance and judges that notification is required (step S34).

According to the notification process described above, even a system without a special interface can immediately notify a driver that performs control over each device or the application program of another system, of the severance of a device.

Since a variety of conditions of a driver, a device, etc., are automatically checked, an erroneous operation due to notification by mistake of the severance of a device can be prevented. Since the system manager can determine to which units notification is made, device groups, drivers or devices, depending on the condition of a driver or a device, a system can be flexibly operated.

If a driver itself is a failure-monitoring target, a failure can be immediately detected by notifying the driver of the severance. For example, if an interrupt handler activated by the issuance of a pseudo-interrupt detects an access error and a driver outputs error information, it is detected that the driver fails. The same applies to a case where an entry activated by the issuance of an access instruction detects an access error.

By notifying a driver of the severance, shared resources, such as a bus, etc., can be immediately released.

Since by notifying the application program of another system, of the severance, a charging process by the application program can be immediately stopped, the occurrence of an unreasonable charging can also be prevented.

In this way, problems caused by non-recognition of the severance (unreasonable charging, etc.) and problems caused by delay in the recognition of the severance (a problem that an event to be detected cannot be detected, etc.) can be prevented.

According to the preferred embodiment described above, in a system of severing a failed device from a system and continuing the operation when a failure is detected in a device during the operation of the system, a notification destination can be notified of the severance of a device without a special interface.

In this way, even a system without a special interface can immediately notify a device control unit that performs control over each device or the application program of another system, of the severance of a device.

Since the developer of a device control unit or an application program can support a dynamic degeneracy function, there is no need to install a special interface in order to recognize the severance of a device. Therefore, the influence on a device control unit or an application program can be minimized.

Even if a device control unit or an application program does not support a function to recognize the severance of a device, an erroneous operation due to the severance can be prevented. Furthermore, an erroneous operation due to reporting the severance of a device by mistake can be prevented and simultaneously the system manager can flexibly operate a system.

Figure 23:
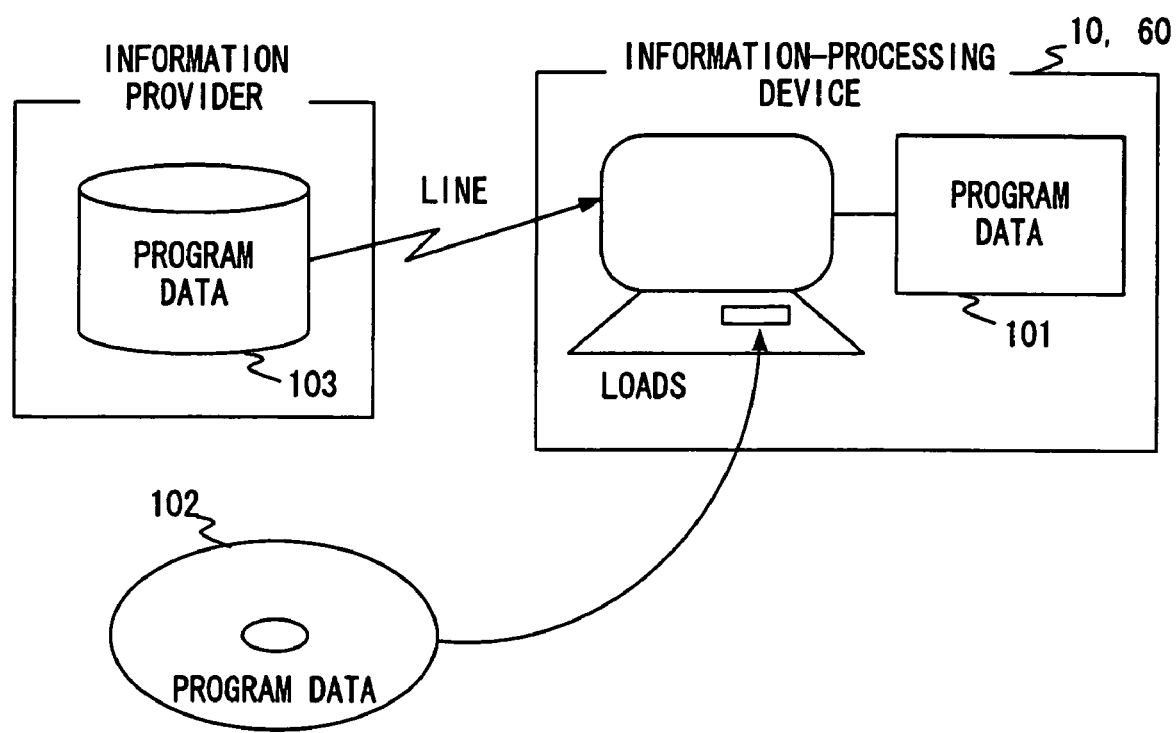
FIG. 23 shows examples of storage media.

FIG. 23 shows examples of computer-readable storage media for providing the information-processing device 10 shown in FIG. 2 and the information-processing device 60 shown in FIG. 15 with a program and data.

A memory 101 includes, for example, a ROM (read-only memory), a RAM (random-access memory), etc., and it is used to store a program and data used for the process. The information-processing device executes necessary processes by using the memory 101 and running the program.

For example, the operation mode determination unit 11, confirmation unit 21, device group judgment unit 22, device control unit judgment unit 23, device judgment unit 24, setting unit 25, device-group setting unit 26, device control unit setting unit 27 and device setting unit 28 shown in FIG. 2 and the confirmation unit 61, external notification unit 62, notification judgment unit 63, device group judgment 71, device control unit judgment unit 72, device judgment unit 73, setting unit 74, device-group setting unit 75, device control unit setting unit 76, device setting unit 77, severance notification unit 64, pseudo-interrupt issuance unit 81 and access instruction issuance unit 82 correspond to the program stored in the memory 101.

A portable storage medium 102 is an arbitrary storage medium, such as a memory card, a floppy disk, a CD-ROM (compact disk read-only memory), an optical disk, a magneto-optical disk, etc. A user stores the program and data described above in this portable storage medium 102 and can use the program and data by loading them into the memory 101, if required.

The information-processing device can use the program and data stored in the database 103 of an external information provider (server) by loading them into the memory 101, if required.

In this case, the server of the information provider generates signals for transmitting the program and data, and transmits the signals to the information-processing device via an arbitrary transmission medium in a network (line).

In the preferred embodiment described above, the operation mode determination unit 11 shown in FIG. 2 and the confirmation unit 61, external notification unit 62, notification judgment unit 63 and severance notification unit 64 shown in FIG. 15 are mainly implemented by software. However, they can also be implemented by hardware. In this case, these elements can be configured using logical circuits, etc.

What is claimed is:

1. A notification apparatus, comprising:
   means for determining a failure has occurred in a device and a use of the failed device is prohibited, the determination of the failure being made independent of a device control unit that performs control over the failed device;
   a notification device for instructing the device control unit that performs control over the failed device to access the failed device when the means for determining determines that the failure has occurred in the failed device;
   wherein the device control unit recognizes the prohibition of use of the failed device if the device control unit is unable to access the failed device.

2. The notification apparatus according to claim 1, wherein said notification device includes a pseudo-interrupt issuance device making the device control unit access the failed device by issuing a pseudo-interrupt to the device control unit and calling up an interrupt process of the device control unit.

3. The notification apparatus according to claim 1, wherein said notification device includes an access instruction issuance device making the device control unit access the failed device by issuing an access instruction to the device control unit and calling up an access process of the device control unit.

4. The notification apparatus according to claim 1, further comprising a notification judgment device judging whether the device control unit should be notified of the prohibition of use of the failed device.

5. The notification apparatus according to claim 4, wherein said notification judgment device includes a device judging whether a device control unit should be notified of a prohibition of use of a failed device for each device group included in the system.

6. The notification apparatus according to claim 4, wherein said notification judgment device includes a device judging whether a device control unit should be notified of a prohibition of use of a failed device for each device control unit that performs control over a device included in the system.

7. The notification apparatus according to claim 4, wherein said notification judgment device includes a device judging whether a device control unit should be notified of a prohibition of use of a failed device for each device included in the system.

8. The notification apparatus according to claim 4, wherein said notification judgment device includes a setting device setting information about whether the device control unit should be notified of the prohibition of use of the failed device, and outputs a judgment result corresponding to the set information.

9. The notification apparatus according to claim 8, wherein said setting device includes a device setting the information for each device group included in the system.

10. The notification apparatus according to claim 8, wherein said setting device includes a device setting the information for each device control unit that performs control over a device included in the system.

11. The notification apparatus according to claim 8, wherein said setting device includes a device setting the information for each device included in the system.

12. The notification apparatus according to claim 4, further comprising a confirmation device checking whether another device in the system is affected by the failed device, said system prohibiting use of a device affected by the failed device and said notification judgment device judging whether a device control unit that performs control over the affected device should be notified of the prohibition of use of the affected device.

13. The notification apparatus according to claim 4, further comprising a confirmation device checking whether another device in the system is affected by the failed device.

14. A computer-readable storage medium on which a program is recorded, said program comprising:
    determining a failure has occurred in a device and a use of the failed device is prohibited, the determination of the failure being made independent of a device control unit that performs control over the failed device;
    enabling a computer to instruct the device control unit that performs control over the failed device to access the failed device when the determination is made that the failure has occurred in the failed device,
    wherein the device control unit recognizes the prohibition of use of the failed device if the device control unit is unable to access the failed device.

15. A notification method, comprising:
    determining a failure has occurred in a device and a use of the failed device is prohibited, the determination of the failure being made independent of a device control unit that performs control over the failed device;
    prohibiting use of the failed device; and
    instructing the device control unit that performs control over the failed device to access the failed device when the determination is made that the failure has occurred in the failed device,
    the device control unit recognizing the prohibition of use of the failed device if the device control unit is unable to access the failed device.

16. A notification apparatus, comprising:
    means for determining a failure has occurred in a device and a use of the failed device is prohibited, the determination of the failure being made independent of a device control unit that performs control over the failed device;
    prohibition means for prohibiting use of the failed device; and
    notification means for instructing the device control unit that performs control over the failed device to access the failed device when said means for determining determines that the failure has occurred in the failed device;
    wherein the device control unit recognizes the prohibition of use of the failed device if the device control unit is unable to access the failed device.

* * * * *